US012607783B1

(12) United States Patent
Hossain

(10) Patent No.: US 12,607,783 B1
(45) Date of Patent: Apr. 21, 2026

(54) SURFACE-ENHANCED RAMAN SCATTERING MATERIAL

(71) Applicant: King Fahd University of Petroleum and Minerals, Dhahran (SA)

(72) Inventor: Mohammad Kamal Hossain, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/244,357

(22) Filed: Jun. 20, 2025

(51) Int. Cl.
| | |
|---|---|
| *G02B 5/00* | (2006.01) |
| *B82Y 20/00* | (2011.01) |
| *B82Y 30/00* | (2011.01) |
| *G02B 1/00* | (2006.01) |

(52) U.S. Cl.
CPC .............. *G02B 5/008* (2013.01); *B82Y 20/00* (2013.01); *B82Y 30/00* (2013.01); *G02B 1/002* (2013.01)

(58) Field of Classification Search
None
See application file for complete search history.

(56) References Cited

U.S. PATENT DOCUMENTS

| | | |
|---|---|---|
| 11,480,524 B1 | 10/2022 | Hossain et al. |
| 2021/0285089 A1 | 9/2021 | Xiao |

FOREIGN PATENT DOCUMENTS

| | | |
|---|---|---|
| CN | 104162681 B | 1/2016 |
| CN | 112098390 B | 12/2021 |
| CN | 116924696 A | 10/2023 |

OTHER PUBLICATIONS

Meng et al. (Ag-decorated ultra-thin porous single-crystalline ZnO nanosheets prepared by sunlight induced solvent reduction and their highly sensitive detection of ethanol), vol. 209, 2015, pp. 975-982, (Year: 2015).*

Bhattacharyya et al., (Microwave-Assisted Insertion of Silver Nanoparticles into 3-D Mesoporous Zinc Oxide Nanocomposites and Nanorods), The Journal of Physical Chemistry C, 2008, 112 (3), pp. 659-665 (Year: 2008).*

M.E. Koleva, et al., "Fabrication of Ag/ZnO nanostructures for SERS applications", Applied Surface Science, vol. 508, Dec. 31, 2019, 145227, Excerpts only, 6 pages.

Zhiwei Wang, et al., "Ag-nanoparticle-decorated porous ZnO-nanosheets grafted on a carbon fiber cloth as effective SERS substrates", Nanoscale, vol. 6, Issue 24, Oct. 23, 2014, pp. 15280-15285, Abstract only, 2 pages.

* cited by examiner

*Primary Examiner* — Elizabeth Collister
(74) *Attorney, Agent, or Firm* — Oblon, McClelland, Maier & Neustadt, L.L.P.

(57) ABSTRACT

A surface-enhanced Raman scattering material includes a zinc oxide nanostructure and silver nanoparticles. The silver nanoparticles are incorporated into the zinc oxide nanostructure to form a silver nanoparticle-incorporated zinc oxide nanostructure. The silver nanoparticle-incorporated zinc oxide nanostructure includes zinc in an amount of 52 to 58 percent by weight (wt. %), oxygen in an amount of 42 to 47 wt. %, and silver in an amount of 0.1 to 0.6 wt. % based on a total weight of the silver nanoparticle-incorporated zinc oxide nanostructure. The silver nanoparticle-incorporated zinc oxide nanostructure is porous with an average pore diameter of 20 to 100 nanometers (nm).

20 Claims, 22 Drawing Sheets

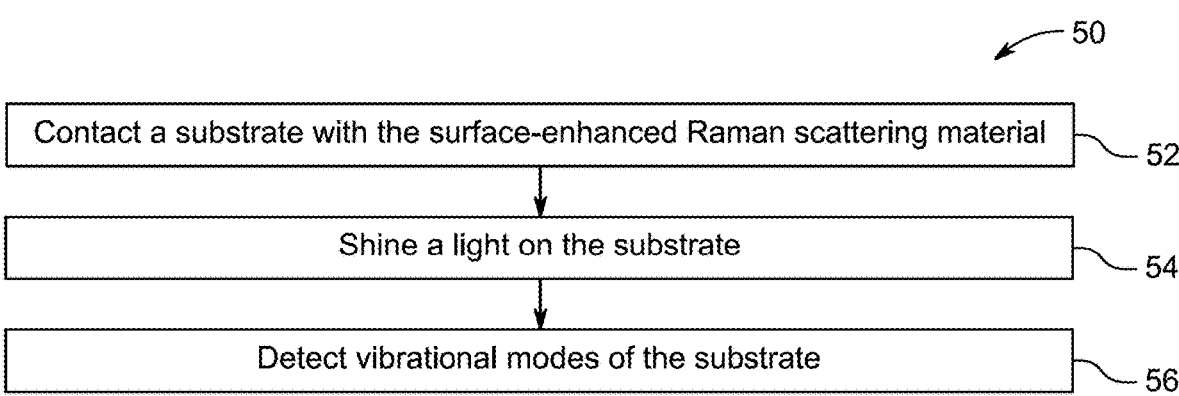

50

| |
|---|
| Contact a substrate with the surface-enhanced Raman scattering material |

52

| |
|---|
| Shine a light on the substrate |

54

| |
|---|
| Detect vibrational modes of the substrate |

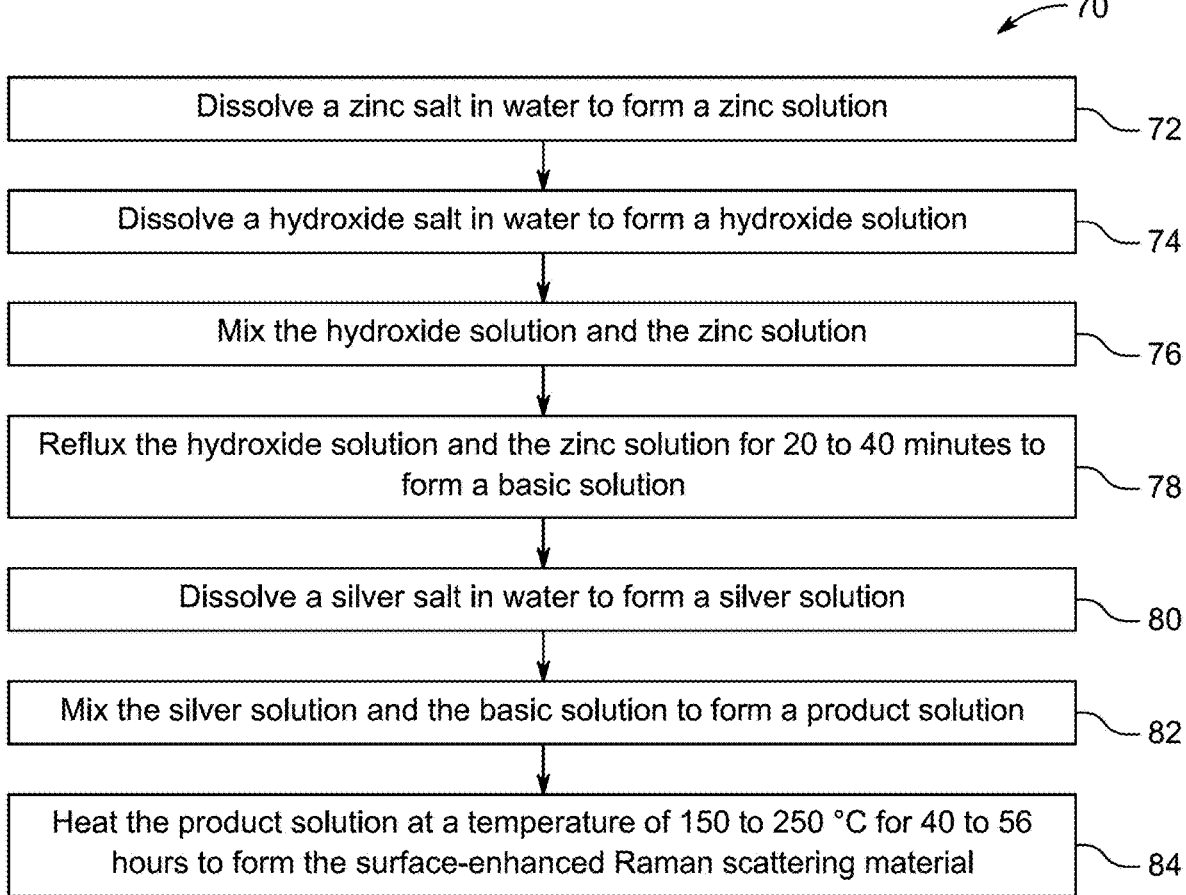

70

| |
|---|
| Dissolve a zinc salt in water to form a zinc solution |

72

| |
|---|
| Dissolve a hydroxide salt in water to form a hydroxide solution |

74

| |
|---|
| Mix the hydroxide solution and the zinc solution |

76

| |
|---|
| Reflux the hydroxide solution and the zinc solution for 20 to 40 minutes to form a basic solution |

78

| |
|---|
| Dissolve a silver salt in water to form a silver solution |

80

| |
|---|
| Mix the silver solution and the basic solution to form a product solution |

82

| |
|---|
| Heat the product solution at a temperature of 150 to 250 °C for 40 to 56 hours to form the surface-enhanced Raman scattering material |

| SEM HV: 20.0 kV | WD: 9.71 mm | | LYRA3 TESCAN |
| View field: 2.89 µm | Det: SE | 500 nm | |

| Element | Weight % | Atomic % |
|---------|----------|----------|
| O K | 44.50 | 76.66 |
| Zn K | 55.16 | 23.25 |
| Ag L | 0.34 | 0.09 |

Ag La1

Energy/ eV

LUMO

HOMO

-3.3 eV 1.2 eV 2.4 eV

-5.7 eV

Rhodamine 6G

X

CB

VB

-4.5 eV 3.2 eV

-7.7 eV

ZnO-NSs $\lambda_{exc}$ = 532.8 nm
(2.33 eV)

SURFACE-ENHANCED RAMAN SCATTERING MATERIAL

BACKGROUND

Technical Field

The present disclosure is directed towards a surface-enhanced Raman scattering material, more particularly, to a surface-enhanced Raman scattering material comprising a zinc oxide nanostructure and silver oxide particles.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Surface-enhanced Raman spectroscopy (SERS) is a powerful analytical technique that amplifies a Raman signal of molecules adsorbed near designed substrates, enabling detection at ultra-low concentrations. Noble metal nanostructures, particularly those based on gold and silver, have been the choice for SERS-active substrates due to their strong localized surface plasmon resonances (LSPRs), which generate intense electromagnetic (EM) field enhancements; however, these materials suffer from limitations including instability, oxidation, and limited tunability.

Semiconductor nanostructures, such as zinc oxide nanostructures (ZnO-NSs), have emerged as alternatives due to their physical properties, tunability in size and shape, and cost-effective synthesis. ZnO-NSs can be combined with noble metal nanoparticles to form plasmonic hybrid structures that leverage the advantages of both components. In these hybrids, noble metals help shift the LSPR to the visible spectrum and enhance EM fields, while ZnO provides structural versatility and additional charge transfer mechanisms.

Despite the promising features of these hybrid nanostructures, challenges remain in achieving uniform decoration, precise control overgrowth mechanisms, and stable integration of noble metal nanoparticles within semiconductor matrices. Such difficulties limit the reproducibility, stability, and performance of SERS substrates, impeding their broader application. Synthesis methods and the resulting materials suffer from one or more drawbacks hindering their adoption. Accordingly, an objective of the present disclosure to provide a surface-enhanced Raman scattering material and a synthesis method that may circumvent the drawbacks of materials known in the art.

SUMMARY

In an exemplary embodiment, a surface-enhanced Raman scattering material is described.

The surface-enhanced Raman scattering material includes a zinc oxide nanostructure and silver nanoparticles. The silver nanoparticles are incorporated into the zinc oxide nanostructure to form a silver nanoparticle-incorporated zinc oxide nanostructure. The silver nanoparticle-incorporated zinc oxide nanostructure includes zinc in an amount of 52 to 58 percent by weight (wt. %), oxygen in an amount of 42 to 47 wt. %, and silver in an amount of 0.1 to 0.6 wt. % based on a total weight of the silver nanoparticle-incorpo-rated zinc oxide nanostructure. The silver nanoparticle-incorporated zinc oxide nanostructure is porous with an average pore diameter of 20 to 100 nanometers (nm).

In some embodiments, the zinc oxide nanostructure has a wurtzite structure.

In some embodiments, the zinc oxide nanostructure has a P63mc space group.

In some embodiments, the zinc oxide nanostructure includes zinc in an amount of 56 to 60 wt. % and oxygen in an amount of 39 to 43 wt. % based on a total weight of the zinc oxide nanostructure.

In some embodiments, the zinc oxide nanostructure is in the form of agglomerated six-sided beams with an average length of 100 to 2000 nm.

In some embodiments, the agglomerated six-sided beams are branched with a face of a first six-sided beam attached to a side of a second six-sided beam.

In some embodiments, sides of the agglomerated six-sided beams have an average length of 300 to 500 nm.

In some embodiments, the silver nanoparticle-incorporated zinc oxide nanostructure has an average length of 1 to 4 micrometers ($\mu$m) and an average width of 0.5 to 3 $\mu$m.

In some embodiments, the zinc oxide nanostructure has a lattice fringe spacing of 0.28 to 0.29 nm.

In some embodiments, the silver nanoparticle-incorporated zinc oxide nanostructure has a lattice fringe spacing of 0.27 to 0.28 nm and 0.21 to 0.23 nm.

In some embodiments, silver nanoparticles in the silver nanoparticle-incorporated zinc oxide nanostructure have a face-centred-cubic (fcc) crystal structure.

In some embodiments, the silver nanoparticles are in the shape of spheres having an average diameter of 2 to 20 nm.

In some embodiments, the silver nanoparticle-incorporated zinc oxide nanostructure has d-values of 2.39 to 2.4 Å, 2.39 to 2.41 Å, 1.86 to 1.87 Å, 1.39 to 1.4 Å, 1.2 to 1.21 Å, and 0.92 to 0.94 Å.

In another embodiment, a method of surface-enhanced Raman spectroscopy includes contacting a substrate with the surface-enhanced Raman scattering material. The substrate is adsorbed onto the surface-enhanced Raman scattering material. The method further includes shining a light on the substrate and detecting vibrational modes of the substrate.

In some embodiments, enhancement factors for vibrational modes of the substrate are from $1 \times 10^5$ to $5 \times 10^6$ determined by an intensity of peaks and a number of analytes in Raman spectra.

In some embodiments, an excitation wavelength is from 530 to 535 nm.

In some embodiments, the substrate is rhodamine 6G.

In some embodiments, the substrate is not detected on the surface-enhanced Raman scattering material without the silver nanoparticles.

In some embodiments, vibrational modes of the substrate are enhanced by electromagnetic enhancement and chemical enhancement.

In another embodiment, the surface-enhanced Raman scattering material is made by a process including dissolving a zinc salt in water to form a zinc solution, dissolving a hydroxide salt in water to form a hydroxide solution, mixing the hydroxide solution and the zinc solution, refluxing the hydroxide solution and the zinc solution for 20 to 40 minutes to form a basic solution, dissolving a silver salt in water to form a silver solution, mixing the silver solution and the basic solution to form a product solution, and heating the product solution at a temperature of 150 to 250° C. for 40 to 56 hours to form the surface-enhanced Raman scattering material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is a flow chart of a method of surface-enhanced Raman spectroscopy, according to certain embodiments.

FIG. 1B is a flow chart of a process of making the surface-enhanced Raman scattering material, according to certain embodiments.

DETAILED DESCRIPTION

Figure 1C:
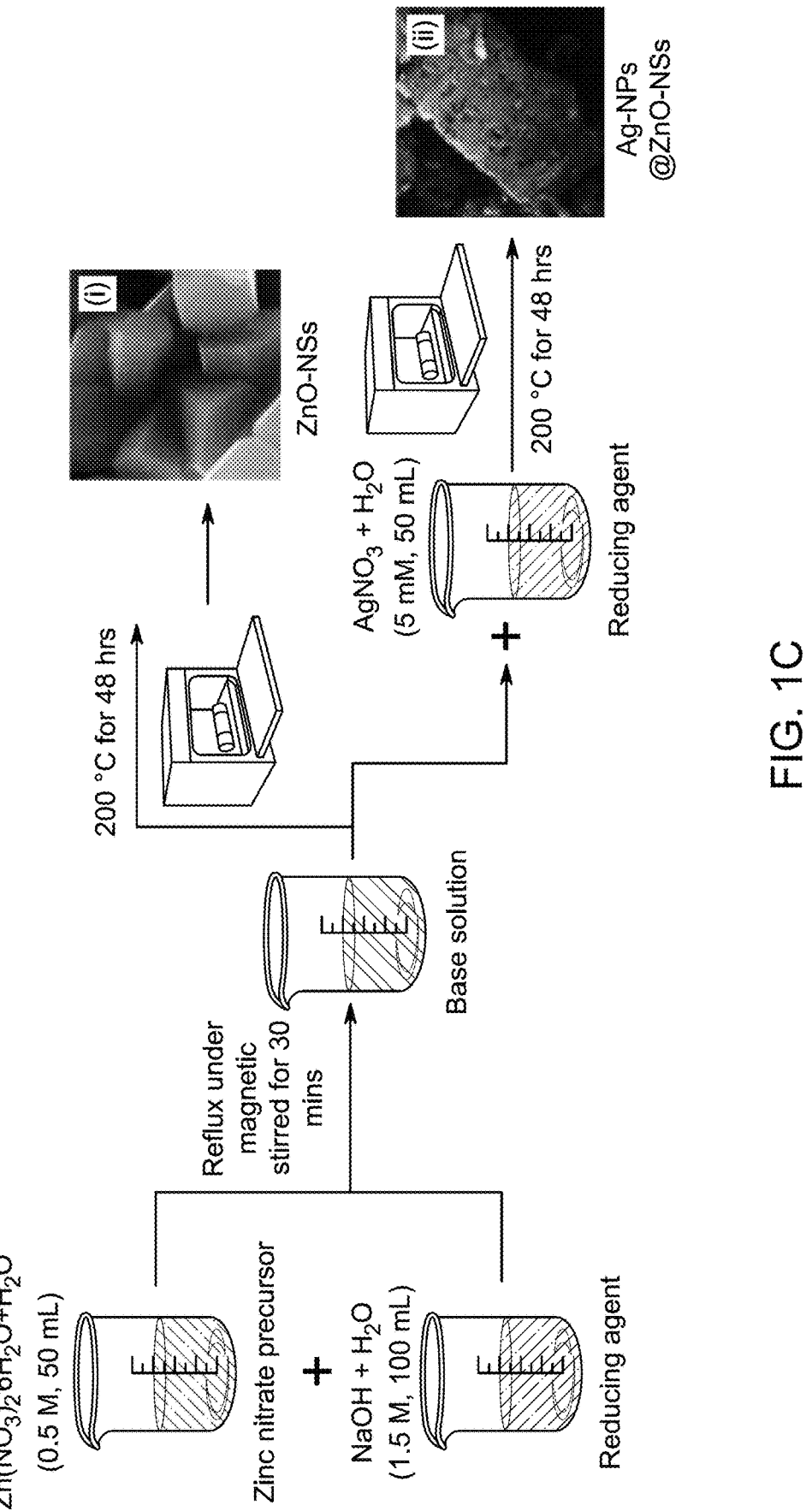
FIG. 1C is a schematic diagram demonstrating a synthesis route to a zinc oxide nanostructure (ZnO-NS) and a silver nanoparticle-incorporated zinc oxide nanostructure (Ag-NP@ZnO-NS), according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals will be used to designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

As used herein, the term "room temperature" refers to a temperature range of 25+3 degrees Celsius (° C.).

As used herein, the term "nanoparticles (NPs)" refer to tiny objects that have at least one dimension in the range of 1 to 100 nanometers (nm). Their size, shape, and surface properties can be manipulated at the molecular or atomic level. Due to their small size, NPs exhibit different physical and chemical properties compared to their bulk counterparts, such as increased surface area, enhanced reactivity. The NPs may exist in various morphological shapes, such as nanosheets, nanorods, nanospheres, nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, a combination thereof, and the like.

As used herein, the term "pore diameter" refers to an average width or size of void spaces (pores) within a material, typically measured in nm or angstroms (Å). It is a parameter used in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term "surface-enhanced Raman scattering (SERS) material" is a specially engineered substrate that is typically composed of noble metals such as gold or silver that amplifies Raman scattering signals of molecules adsorbed on its surface. This enhancement occurs due to localized surface plasmon resonances and/or chemical interactions, making SERS materials sensitive for molecular detection and analysis.

As used herein, the term "wurtzite structure" refers to a hexagonal crystal arrangement where atoms are tetrahedrally coordinated and stacked in an ABABABABAB sequence along the c-axis. This structure is characteristic of materials such as zinc oxide (ZnO), gallium nitride (GaN), and zinc sulfide (ZnS). The corresponding space group is No. 186 (in International Union of Crystallography classification) or P6$_3$mc (in Hermann-Mauguin notation). The wurtzite crystal structure is referred to by the Strukturbericht designation B4 and the Pearson symbol hP4.

As used herein, the term "P6$_3$mc space group" refers to a specific crystallographic symmetry classification within a hexagonal crystal system, denoted as space group number 186 in the International Tables for Crystallography. This space group is characterized by a sixfold screw axis (6$_3$) along the c-axis, a mirror plane (m) perpendicular to the c-axis, and a glide plane (c) with a normal vector in the direction.

As used herein, the term "lattice fringe spacing" refers the periodic distance between planes of atoms in a crystal, observable in electron microscopy images as alternating dark and light bands, indicative of atomic plane spacing.

As used herein, the term "face-centered cubic (fcc) crystal structure" refers a type of crystal lattice where atoms are positioned at each corner and at the center of each face of a cube, resulting in an efficient packing arrangement.

As used herein, the term "d-values" refers the interplanar spacings between parallel planes of atoms in a crystal lattice, commonly determined through X-ray diffraction techniques.

As used herein, the term "vibrational modes" refers the patterns of oscillatory motion of atoms within a molecule or crystal lattice, each characterized by a specific frequency and amplitude.

As used herein, the term "electromagnetic enhancement" refers the amplification of Raman scattering signals due to the localized electromagnetic fields generated by surface plasmon resonances on nanostructured metal surfaces.

As used herein, the term "chemical enhancement" refers the increase in Raman signal intensity resulting from charge transfer interactions between analyte molecules and a substrate, affecting the polarizability of the molecules.

Aspects of the present disclosure are directed to a surface-enhanced Raman scattering (SERS)-active construct including zinc oxide nanostructures (ZnO-NSs) functionalized with silver nanoparticles (Ag-NPs). In the present disclosure, ZnO-NSs serve as a high-surface-area platform that can be effectively decorated with SERS-active metallic nanostructures. A generic synthesis approach has been employed to fabricate ZnO-NSs and incorporate Ag-NPs onto their surfaces, resulting in a nanoporous, delicate composite structure. The structural and crystallographic features of the composite, confirmed through advanced electron microscopy and diffraction techniques, indicate the coexistence of wurtzite-phase ZnO and face-centered-cubic structured Ag. This functional hybrid material demonstrates good SERS-activity due to combined electromagnetic and chemical enhancement effects, thereby offering a versatile and efficient route for designing sensitive SERS platforms.

A surface-enhanced Raman scattering material is described. The surface-enhanced Raman scattering material includes a zinc oxide nanostructure and silver nanoparticles. The silver nanoparticles are incorporated into the zinc oxide nanostructure to form a silver nanoparticle-incorporated zinc oxide nanostructure. The silver nanoparticle-incorporated zinc oxide nanostructure includes zinc in an amount of 52 to 58 percent by weight (wt. %), preferably 52.5 to 57.5 wt. %, preferably 53 to 57 wt. %, preferably 53.5 to 56.5 wt. %, preferably 54 to 56 wt. %, preferably 54.5 to 55.8 wt. %, preferably 54.8 to 55.5 wt. %, preferably 55 to 55.4 wt. %, more preferably 55.1 to 55.3 wt. %, and yet more preferably about 55.16 wt. %, oxygen in an amount of 42 to 47 wt. %, preferably 42.5 to 46.5 wt. %, preferably 43 to 46 wt. %, preferably 43.5 to 45.5 wt. %, preferably 44 to 45 wt. %, preferably 44.1 to 44.9 wt. %, preferably 44.2 to 44.8 wt. %, preferably 44.3 to 44.7 wt. %, more preferably 44.4 to 44.6 wt. %, and yet more preferably about 44.5 wt. %, and silver in an amount of 0.1 to 0.6 wt. %, preferably 0.15 to 0.55 wt. %, preferably 0.2 to 0.5 wt. %, preferably 0.25 to 0.45 wt. %, preferably 0.28 to 0.4 wt. %, preferably 0.3 to 0.38 wt. %, preferably 0.32 to 0.36 wt. %, more preferably 0.33 to 0.35 wt. %, and yet more preferably about 0.34 wt. % based on a total weight of the silver nanoparticle-incorporated zinc oxide nanostructure.

The silver nanoparticle-incorporated zinc oxide nanostructure is porous with an average pore diameter of 20 to 100 nanometers (nm), preferably 25 to 95 nm, preferably 30 to 90 nm, preferably 35 to 85 nm, preferably 40 to 80 nm, preferably 45 to 75 nm, preferably 50 to 70 nm, and preferably 55 to 65 nm.

In some embodiments, the zinc oxide nanostructure has a wurtzite structure. In alternative embodiments, the zinc oxide nanostructure may have any other crystal structure known in the art. In some embodiments, the zinc oxide nanostructure has a P63mc space group. In alternative embodiments, the zinc oxide nanostructure may have any other crystal structure known in the art.

In some embodiments, the zinc oxide nanostructure includes zinc in an amount of 56 to 60 wt. %, preferably 56.5 to 59.5 wt. %, preferably 57 to 59 wt. %, preferably 57.5 to 58.9 wt. %, preferably 58 to 58.8 wt. %, preferably 58.5 to 58.7 wt. %, more preferably 58.6 to 58.65 wt. %, and yet more preferably about 58.64 wt. % and oxygen in an amount of 39 to 43 wt. %, preferably 39.5 to 42.5 wt. %, preferably 40 to 42 wt. %, preferably 40.5 to 41.9 wt. %, preferably 41 to 41.8 wt. %, preferably 41.1 to 41.7 wt. %, preferably 41.2 to 41.6 wt. %, more preferably 41.3 to 41.5 wt. %, and yet more preferably about 41.36 wt. % based on a total weight of the zinc oxide nanostructure.

In some embodiments, the zinc oxide nanostructure is in the form of agglomerated six-sided beams with an average length of 100 to 2000 nm, preferably 200 to 1900 nm, preferably 300 to 1800 nm, preferably 400 to 1700 nm, preferably 500 to 1600 nm, preferably 600 to 1500 nm, preferably 700 to 1400 nm, preferably 800 to 1300 nm, preferably 900 to 1200 nm, and preferably 1000 to 1100 nm. In some embodiments, the agglomerated six-sided beams are branched with a face of a first six-sided beam attached to a side of a second six-sided beam. In some embodiments, the agglomerated six-sided beams are branched with at least 1, preferably at least 2, preferably at least 3, preferably at least 4, preferably at least 5, and preferably at least 6 branches. In some embodiments, the branches are attached to the agglomerated six-sided beams at an acute angle, a right angle, and an obtuse angle. In some embodiments, sides of the agglomerated six-sided beams have an average length of 300 to 500 nm, preferably 320 to 480 nm, preferably 340 to 460 nm, preferably 360 to 440 nm, and preferably 380 to 420 nm.

In some embodiments, the silver nanoparticle-incorporated zinc oxide nanostructure has an average length of 1 to 4 micrometers ($\mu$m), preferably 1.5 to 3.5 $\mu$m, preferably 1.8 to 3.2 $\mu$m, preferably 2 to 3 $\mu$m, preferably 2.1 to 2.9 $\mu$m, preferably 2.2 to 2.8 $\mu$m, preferably 2.3 to 2.7 $\mu$m, and preferably 2.4 to 2.6 $\mu$m and an average width of 0.5 to 3 $\mu$m, preferably 0.8 to 2.5 $\mu$m, preferably 1 to 2 $\mu$m, preferably 1.1 to 1.9 $\mu$m, preferably 1.2 to 1.8 $\mu$m, preferably 1.3 to 1.7 $\mu$m, and preferably about 1.4 to 1.6 $\mu$m.

In some embodiments, the zinc oxide nanostructure has a lattice fringe spacing of 0.28 to 0.29 nm, preferably 0.281 to 0.289 nm, preferably 0.282 to 0.288 nm, preferably 0.283 to 0.287 nm, and preferably 0.284 to 0.286 nm. In some embodiments, the silver nanoparticle-incorporated zinc oxide nanostructure has a lattice fringe spacing of 0.27 to 0.28 nm, preferably 0.271 to 0.279 nm, preferably 0.272 to 0.278 nm, preferably 0.273 to 0.277 nm, and preferably 0.274 to 0.276 nm and 0.21 to 0.23 nm, preferably 0.211 to 0.229 nm, preferably 0.212 to 0.228 nm, preferably 0.213 to 0.227 nm, preferably 0.214 to 0.226 nm, preferably 0.215 to 0.225 nm, preferably 0.216 to 0.224 nm, and preferably 0.217 to 0.223 nm. In some embodiments, silver nanoparticles in the silver nanoparticle-incorporated zinc oxide nanostructure have a face-centered-cubic (fcc) crystal structure. In alternative embodiments, the silver nanoparticles in the silver nanoparticle-incorporated zinc oxide nanostructure may have any other crystal structure known in the art.

In some embodiments, the zinc oxide nanostructure has d-values of 2.79 to 2.84 angstroms (Å), preferably 2.795 to 2.835 Å, preferably 2.8 to 2.83 Å, preferably 2.805 to 2.825 Å, and preferably 2.81 to 2.82 Å, 1.57 to 1.67 Å, preferably 1.58 to 1.66 Å, preferably 1.59 to 1.65 Å, and preferably 1.6 to 1.645 Å, 1.42 to 1.44 Å, preferably 1.425 to 1.439 Å, preferably 1.43 to 1.438 Å, and preferably 1.435 to 1.437 Å, 1.59 to 1.63 Å, preferably 1.595 to 1.625 Å, preferably 1.6 to 1.62 Å, and preferably 1.605 to 1.615 Å, 0.94 to 0.96 Å, preferably 0.943 to 0.955 Å, preferably 0.945 to 0.953 Å, preferably 0.946 to 0.952 Å, and preferably 0.947 to 0.951 Å, and 0.82 to 0.84 Å, preferably 0.825 to 0.835 Å, preferably 0.827 to 0.833 Å, and preferably 0.828 to 0.832 Å.

In some embodiments, the silver nanoparticles are in the shape of spheres having an average diameter of 2 to 20 nm, preferably 3 to 19 nm, preferably 4 to 18 nm, preferably 5 to 17 nm, preferably 6 to 16 nm, preferably 7 to 15 nm, preferably 8 to 14 nm, preferably 9 to 13 nm, and preferably 10 to 12 nm.

In some embodiments, the silver nanoparticle-incorporated zinc oxide nanostructure has d-values of 2.39 to 2.4 Å, preferably 2.391 to 2.399 Å, preferably 2.392 to 2.398 Å, preferably 2.393 to 2.397 Å, preferably 2.394 to 2.396 Å, and more preferably about 2.394 Å, 2.39 to 2.41 Å, preferably 2.395 to 2.405 Å, preferably 2.398 to 2.408 Å, preferably 2.400 to 2.406 Å, preferably 2.402 to 2.404 Å, and more preferably about 2.4031 Å, 1.86 to 1.87 Å, preferably 1.861 to 1.869 Å, preferably 1.862 to 1.868 Å, preferably 1.863 to 1.867 Å, preferably 1.864 to 1.866 Å, and more preferably about 1.864 Å, 1.39 to 1.4 Å, preferably 1.391 to 1.399 Å, preferably 1.392 to 1.398 Å, preferably 1.394 to 1.398 Å, preferably 1.395 to 1.397 Å, and more preferably about 1.396 Å, 1.2 to 1.21 Å, preferably 1.202 to 1.208 Å, preferably 1.203 to 1.207 Å, preferably 1.204 to 1.206 Å, and more preferably about 1.205 Å, and 0.92 to 0.94 Å, preferably 0.925 to 0.935 Å, preferably 0.927 to 0.933 Å, preferably 0.929 to 0.931 Å, and more preferably about 0.930 Å.

FIG. 1A illustrates a flow chart of a method 50 of surface-enhanced Raman spectroscopy. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes contacting a substrate with the surface-enhanced Raman scattering material. The substrate is adsorbed onto the surface-enhanced Raman scattering material.

At step 54, the method 50 includes shining a light on the substrate. In some embodiments, the light may be monochromatic light from a laser in the visible, near infrared, or near ultraviolet ranges. In some embodiments, X-rays may be used. In other embodiments, any light source may be used. In some embodiments, an excitation wavelength is from 530 to 535 nm, preferably 530.1 to 534.5 nm, preferably 530.2 to 534 nm, preferably 530.3 to 533.5 nm, preferably 530.4 to 533 nm, preferably 530.5 to 532.5 nm, preferably 530.6 to 535 nm, and yet more preferably about 532 nm.

In some embodiments, the substrate is rhodamine 6G. In other embodiments, the substrate is rhodamin WT, Texas red, rhodamine 123, and rhodamine B. In other embodiments, any fluorescent dye may be used as the substrate. In other embodiments, any dye may be used as the substrate. In some embodiments, one or more dyes may be used as the substrate. In some embodiments, noble metals, metal-organic frameworks (MOFs), mxenes, semiconductors, graphene, graphene oxide, bimetallic nanostructures, and paper-based substrates may be used as the substrate. In other embodiments, the substrate may be any material known in the art. In some embodiments, the substrate is not detected on the surface-enhanced Raman scattering material without the silver nanoparticles.

At step 56, the method 50 includes detecting vibrational modes of the substrate. In some embodiments, vibrational modes of the substrate are enhanced by electromagnetic enhancement and chemical enhancement. In some embodiments, enhancement factors for vibrational modes of the substrate are from $1\times10^5$ to $5\times10^6$, preferably $2\times10^5$ to $4\times10^6$, preferably $3\times10^5$ to $3\times10^6$, preferably $4\times10^5$ to $2\times10^6$, preferably $5\times10^5$ to $1\times10^6$, preferably $6\times10^5$ to $9\times10^5$, and preferably $7\times10^5$ to $8\times10^5$ determined by an intensity of peaks and a number of analytes in Raman spectra.

FIG. 1B illustrates a flow chart of a process 70 of making the surface-enhanced Raman scattering material. The order in which the process 70 is described is not intended to be construed as a limitation, and any number of the process steps can be combined in any order to implement the process 70. Additionally, individual steps may be removed or skipped from the process 70 without departing from the spirit and scope of the present disclosure.

At step 72, the process 70 includes dissolving a zinc salt in water to form a zinc solution. Examples of the zinc salt may include, but are not limited to, zinc nitrate hexahydrate, zinc acetate dihydrate, zinc sulfate heptahydrate, zinc chloride, zinc bromide, zinc iodide, zinc fluoride, zinc oxalate, zinc phosphate, zinc carbonate, zinc perchlorate, zinc thiocyanate, zinc formate, zinc citrate, zinc tartrate, zinc lactate, zinc gluconate, zinc salicylate, zinc stearate, zinc arsenate, zinc molybdate, zinc tungstate, zinc chromate, zinc silicate, zinc selenite, zinc vanadate, zinc pyrophosphate, zinc borate, zinc succinate, zinc benzoate, a combination thereof, and the like. In a preferred embodiment, the zinc salt is zinc nitrate hexahydrate. The water may be tap water, distilled water, bi-distilled water, deionized water, deionized distilled water, reverse osmosis water, a combination thereof, and/or some other water. In a preferred embodiment, the water is deionized water.

At step 74, the process 70 includes dissolving a hydroxide salt in water to form a hydroxide solution. In some embodiments, the hydroxide salt may include, but is not limited to, sodium hydroxide, potassium hydroxide, lithium hydroxide, calcium hydroxide, barium hydroxide, magnesium hydroxide, aluminum hydroxide, ammonium hydroxide, strontium hydroxide, cesium hydroxide, rubidium hydroxide, zinc hydroxide, iron (II) hydroxide, iron (III) hydroxide, copper (II) hydroxide, cobalt (II) hydroxide, nickel (II) hydroxide, manganese (II) hydroxide, chromium (III) hydroxide, lead (II) hydroxide, tin (II) hydroxide, cadmium hydroxide, zirconium hydroxide, lanthanum hydroxide, cerium hydroxide, yttrium hydroxide, thorium hydroxide, samarium hydroxide, praseodymium hydroxide, neodymium hydroxide, a combination thereof, and the like. In a preferred embodiment, the hydroxide salt is sodium hydroxide. The water may be tap water, distilled water, bi-distilled water, deionized water, deionized distilled water, reverse osmosis water, a combination thereof, and/or some other water. In a preferred embodiment, the water is deionized water.

At step 76, the process 70 includes mixing the hydroxide solution and the zinc solution. In some embodiments, methods such as co-precipitation, hydrothermal synthesis, sol-gel method, chemical bath deposition, ultrasonic-assisted mixing, microwave-assisted synthesis, reflux method, dropwise addition, magnetic stirring, mechanical stirring, a combination thereof, and the like may be used for mixing the hydroxide solution and the zinc solution.

At step 78, the process 70 includes refluxing the hydroxide solution and the zinc solution for 20 to 40 minutes, preferably 21 to 39 minutes, preferably 22 to 38 minutes, preferably 23 to 37 minutes, preferably 24 to 36 minutes, preferably 25 to 35 minutes, preferably 26 to 34 minutes, preferably 27 to 33 minutes, preferably 28 to 32 minutes, more preferably 29 to 31 minutes, and yet more preferably about 30 minutes to form a basic solution. Refluxing the hydroxide solution with the zinc solution serves to ensure thorough mixing and sustained reaction under controlled temperature conditions. In a preferred embodiment, the refluxing takes place for 30 minutes at room temperature on a magnetic stirrer.

At step 80, the process 70 includes dissolving a silver salt in water to form a silver solution. In some embodiments, the silver salt may include, but is not limited to, silver nitrate, silver acetate, silver chloride, silver bromide, silver iodide, silver thiocyanate, silver cyanide, silver carbonate, silver sulfate, silver sulfide, silver sulfite, silver phosphate, silver perchlorate, silver fluoride, silver formate, silver oxalate, silver lactate, silver tartrate, silver citrate, silver benzoate, silver propionate, silver butyrate, silver valerate, silver caprylate, silver stearate, silver palmitate, silver oleate, silver linoleate, silver linolenate, silver myristate, silver laurate, silver caprate, a combination thereof, and the like. In a preferred embodiment, the silver salt is silver nitrate $(AgNO_3)$.

At step 82, the process 70 includes mixing the silver solution and the basic solution to form a product solution. In some embodiments, methods such as co-precipitation, hydrothermal synthesis, sol-gel method, chemical bath deposition, ultrasonic-assisted mixing, microwave-assisted synthesis, reflux method, dropwise addition, magnetic stirring, mechanical stirring, a combination thereof, and the like may be used for mixing.

At step 84, the process 70 includes heating the product solution at a temperature of 150 to 250° C., preferably 151 to 249° C., preferably 152 to 248° C., preferably 153 to 247° C., preferably 154 to 246° C., preferably 155 to 245° C., preferably 156 to 244° C., preferably 157 to 243° C., preferably 158 to 242° C., preferably 159 to 241° C., preferably 160 to 240° C., preferably 161 to 239° C., preferably 162 to 238° C., preferably 163 to 237° C., preferably 164 to 236° C., preferably 165 to 235° C., preferably 166 to 234° C., preferably 167 to 233° C., preferably 168 to 232° C., preferably 169 to 231° C., preferably 170 to 230° C., preferably 171 to 229° C., preferably 172 to 228° C., preferably 173 to 227° C., preferably 174 to 226° C., preferably 175 to 225° C., preferably 176 to 224° C., preferably 177 to 223° C., preferably 178 to 222° C., preferably 179 to 221° C., preferably 180 to 220° C., preferably 181 to 219° C., preferably 182 to 218° C., preferably 183 to 217° C., preferably 184 to 216° C., preferably 185 to 215° C., preferably 186 to 214° C., preferably 187 to 213° C., preferably 188 to 212° C., preferably 189 to 211° C., preferably 190 to 210° C., preferably 191 to 209° C., preferably 192 to 208° C., preferably 193 to 207° C., preferably 194 to 206° C., preferably 195 to 205° C., preferably 196 to 204° C., preferably 197 to 203° C., preferably 198 to 202° C., more preferably 199 to 201° C., and yet more preferably about 200° C. for 40 to 56 hours, preferably 41 to 55 hours, preferably 42 to 54 hours, preferably 43 to 53 hours, preferably 44 to 52 hours, preferably 45 to 51 hours, preferably 46 to 50 hours, more preferably 47 to 49 hours, and yet more preferably about 48 hours to form the surface-enhanced Raman scattering material.

EXAMPLES

The following examples describe and demonstrate a surface-enhanced Raman scattering material. The examples are provided solely for illustration and are not to be construed as limitations of the present disclosure, as many variations thereof are possible without departing from the spirit and scope of the present disclosure.

Example 1: Materials and Methods

Zinc nitrate hexahydrate ($Zn(NO_3)_2 \cdot 6H_2O$), silver nitrate ($AgNO_3$) and sodium hydroxide (NaOH) were used as starting materials for synthesizing ZnO-NS and Ag-NPs@ZnO-NS. A revised synthesis method was adopted in silver in the present disclosure [Nguyen, D. T. et al., Experimental and numerical study on photocatalytic activity of the ZnO nanorods/CuO composite film, *Scientific Reports*, 2020, 10, 1, 7792, which is incorporated herein by reference in its entirety]. Two batches of synthesis were carried out to achieved ZnO-NS and Ag-NPs@ZnO-NS. For the preparation of ZnO-NS, 0.5 molar (M) zinc nitrate precursor was prepared by dissolving 7.44 grams (g) of zinc nitrate hexahydrate in 50 milliliters (mL) of deionized water. NaOH was used as a reducing agent, and 1.5 M NaOH stock solution was prepared by dissolving 6 g of NaOH in 100 mL of deionized water. Freshly prepared NaOH solution was added dropwise into zinc nitrate precursor and refluxed for 30 minutes at room temperature on a magnetic stirrer. The solution prepared in this step was considered as the base solution for the synthesis of ZnO-NS and Ag-NPs@ZnO-NS. For the preparation of ZnO-NS, as-prepared based solution was immediately transferred to an autoclave lined with Teflon and exposed to a temperature of 200° C. for 48 hours, as shown in FIG. 1C. Following the hydrothermal treatment in autoclave, a white precipitate was produced. It was filtered, thoroughly cleaned with deionized water, and then dried for a further 24 hours at 100° C. in an oven. A field emission scanning electron microscopy (FESEM) micrograph of ZnO-NS is shown in inset (i) of FIG. 1C. For the preparation of Ag-NPs@ZnO-NS, a silver nitrate precursor was used to catalyze the base solution further. 5 millimolar (mM) of a silver nitrate precursor solution was prepared by dissolving 42 milligrams (mg) of silver nitrate in 50 mL of deionized water. The freshly prepared silver nitrate precursor solution was mixed with the base solution, and the resulting solution was transferred immediately to an oven in a Teflon-lined autoclave. The treatment was carried out for 48 hours at the temperature of 200° C., as shown in FIG. 1C. A gray-white precipitate obtained after the hydrothermal treatment was filtered and washed with deionized water copiously and dried further in an oven at 100° C. for 24 hours. An FESEM micrograph of Ag-NPs@ZnO-NS is shown in the inset (ii) of FIG. 1C. Topographic confirmation was carried out with the aid of a high-resolution FESEM. Due to the resolution constraints of FESEM, the nanoscale features of Ag-NPs in Ag-NPs@ZnO-NS were not well understood; therefore, transmission electron microscopy (TEM) and high-resolution transmission electron microscopy (HR-TEM) investigations were carried out in this regard. Selected area electron diffraction (SAED) patterns and HR-TEM confirmed the existence of Ag-NPs within the Ag-NPs@ZnO-NS.

The surface-enhanced Raman spectroscopy (SERS)-activity of the as-synthesized materials was verified using the Horiba LabRam HR Evolution Raman spectrometer, a fully integrated confocal Raman microscope. All the measurements were carried out in the range of 200 to 1800 wavenumbers (cm-1) at room temperature under ambient conditions. In brief, an excitation source, a He—Ne laser (532.8 nanometers (nm) with 17 milliwatts (mW) base power) was focused on the sample surface through a long working distance lens (50×). The Raman spectrometer was set up as an illumination-backscattering configuration. An objective lens was utilized to focus the laser at the desired location, and an optical analyzed the Raman scattering signal that was obtained from the same location using the same lens. The laser exposure period and accumulation time were held constant at 10 seconds(s) and 2 s, respectively, for the measurements. To prevent dye dissociation or surface damage to the sample, the intensity of laser was set to 25%, and it was turned off immediately following the measurement.

Capping agents or surfactants are usually used to prepare self-assembled nanostructures from colloidal nanomaterials, since aggregation of such nanomaterials is a prevalent problem; however, in SERS studies, capping agents or surfactants are responsible for producing undesired background signals and preventing the target analyte from being in the hot spot, a site of interest for strong SERS signal. The method, described elsewhere, was used in this investigation to prepare the SERS-active substrate [Hossain, M. K. et al., Near-field Raman imaging and electromagnetic field confinement in the self-assembled monolayer array of gold nanoparticles, *Langmuir*, 2008, 24, 17, 9241-9244, which is incorporated herein by reference in its entirety]. In brief, the surface tension of a droplet was enhanced by carefully controlling an aliquot of ZnO-NS solution and Ag-NPs@ZnO-NS solution dropped on microscopic glass slide. Without any additional purification, Rhodamine 6G (R6G from Chroma GesellschaftSchmid GMBH & Co.), a common Raman-active dye, was utilized just as received. As-fabricated substrates of ZnO-NS and Ag-NPs@ZnO-NS were incubated for approximately 10 minutes with $1 \times 10^{-6}$ M of R6G dye. The samples were thoroughly cleaned with DI water prior to the tests, and the measurements were carried out several times at a particular point of interest.

Enhancement in the SERS process is achieved due to nanoscale characteristics, such as the porous surface of hybrid constructions, which offer ample surface area for molecules to adsorb on and for decoration with noble nanoparticles. The SERS process is dominated by electromagnetic (EM) enhancement, but the hybrid construct allows for effective chemical enhancement inside the same process. Although the enhancing variables and mechanisms underlying chemical enhancement remain unclear, it is thought to be related to molecular interactions and charge transfer processes at the metal-metal oxide-analyte system. Before doing SERS measurements, the elemental composition was verified to comprehend the underlying nanoscale characteristics.

Figure 2A:
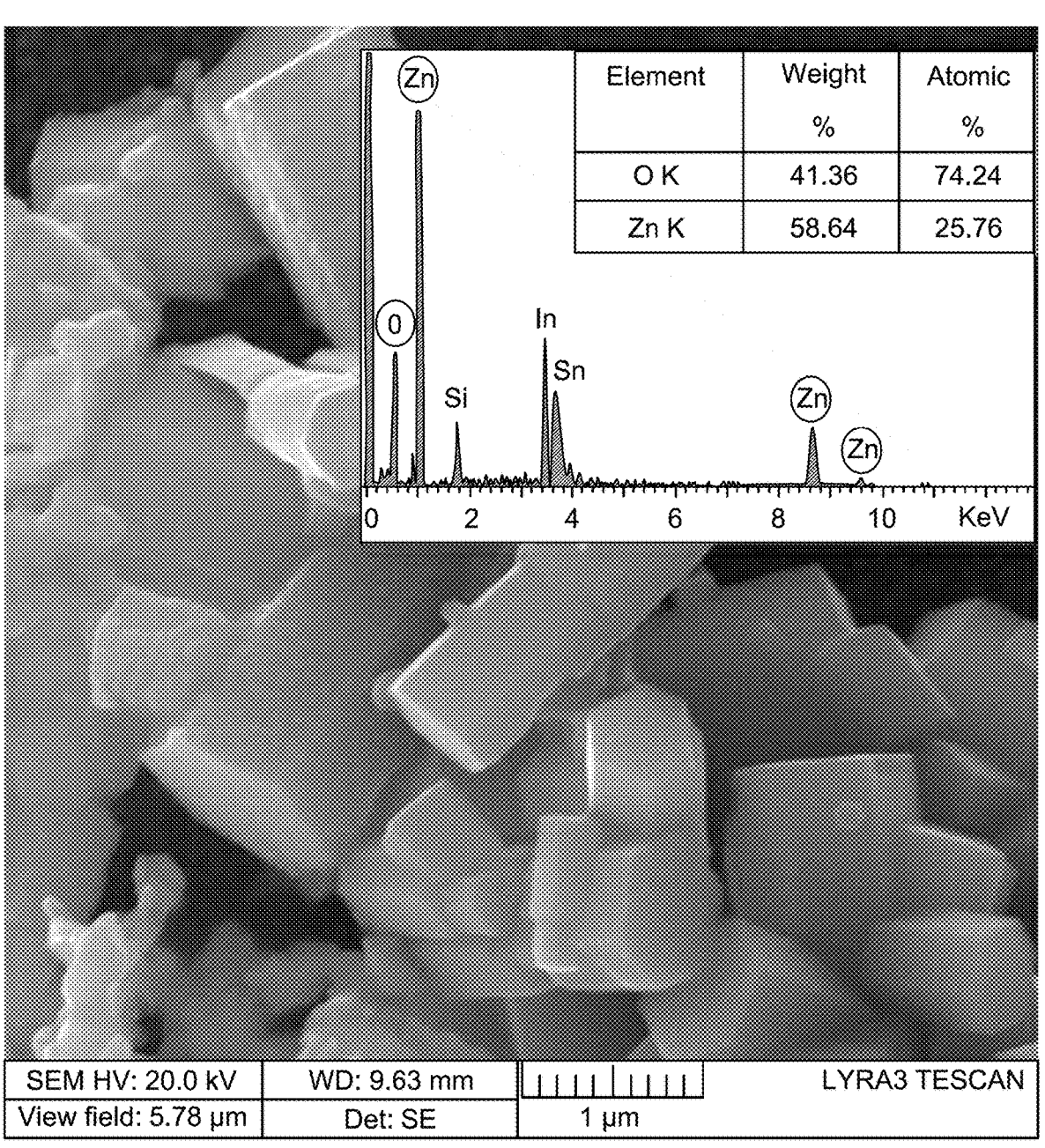
FIG. 2A depicts a low-resolution field emission scanning electron microscopy (FESEM) micrograph and energy dispersive x-ray spectroscopy (EDS) graph of ZnO-NS, according to certain embodiments.
Figure 2B:
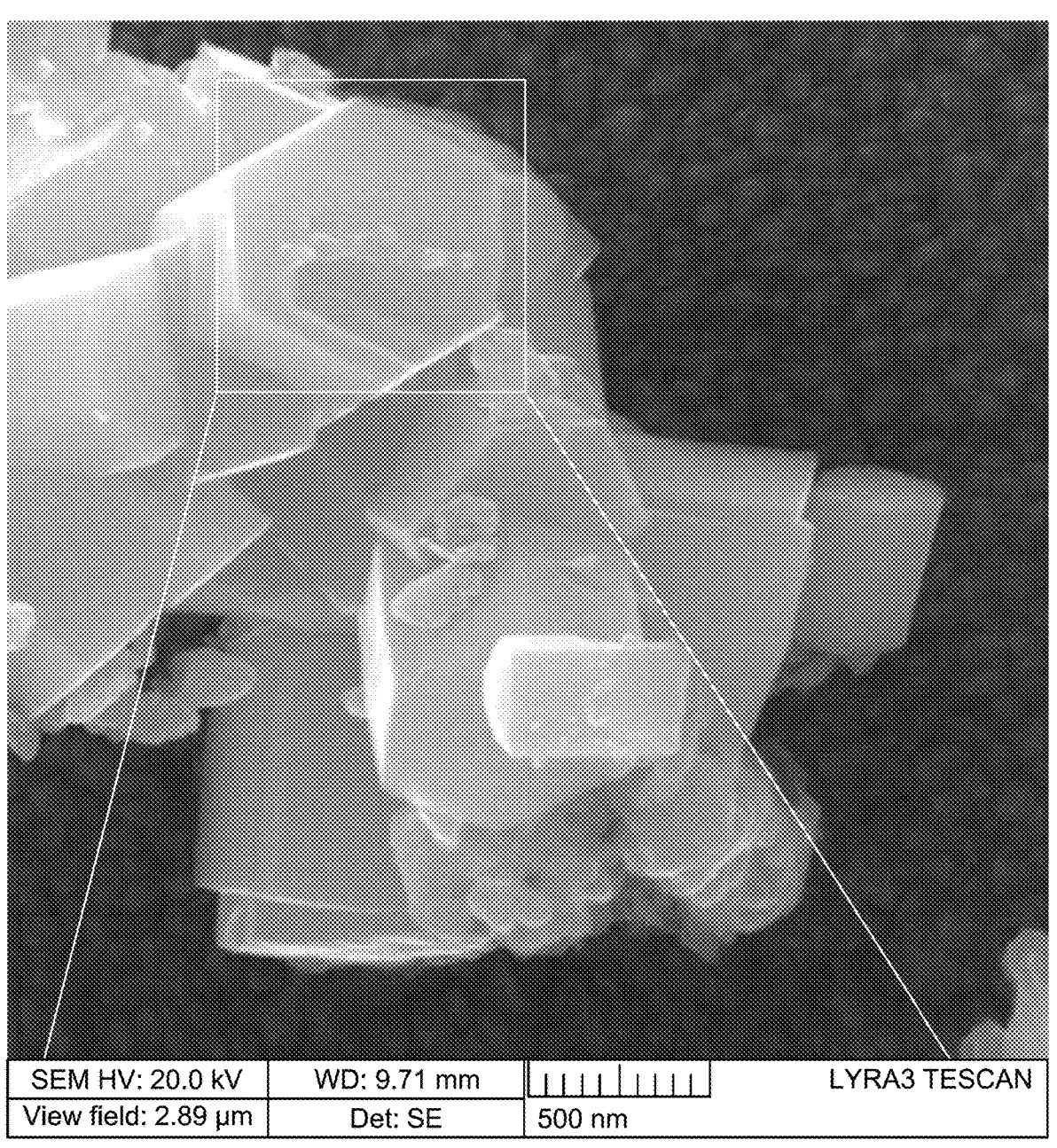
FIG. 2B depicts a high-resolution FESEM micrograph of ZnO-NS, according to certain embodiments.
Figure 2C:
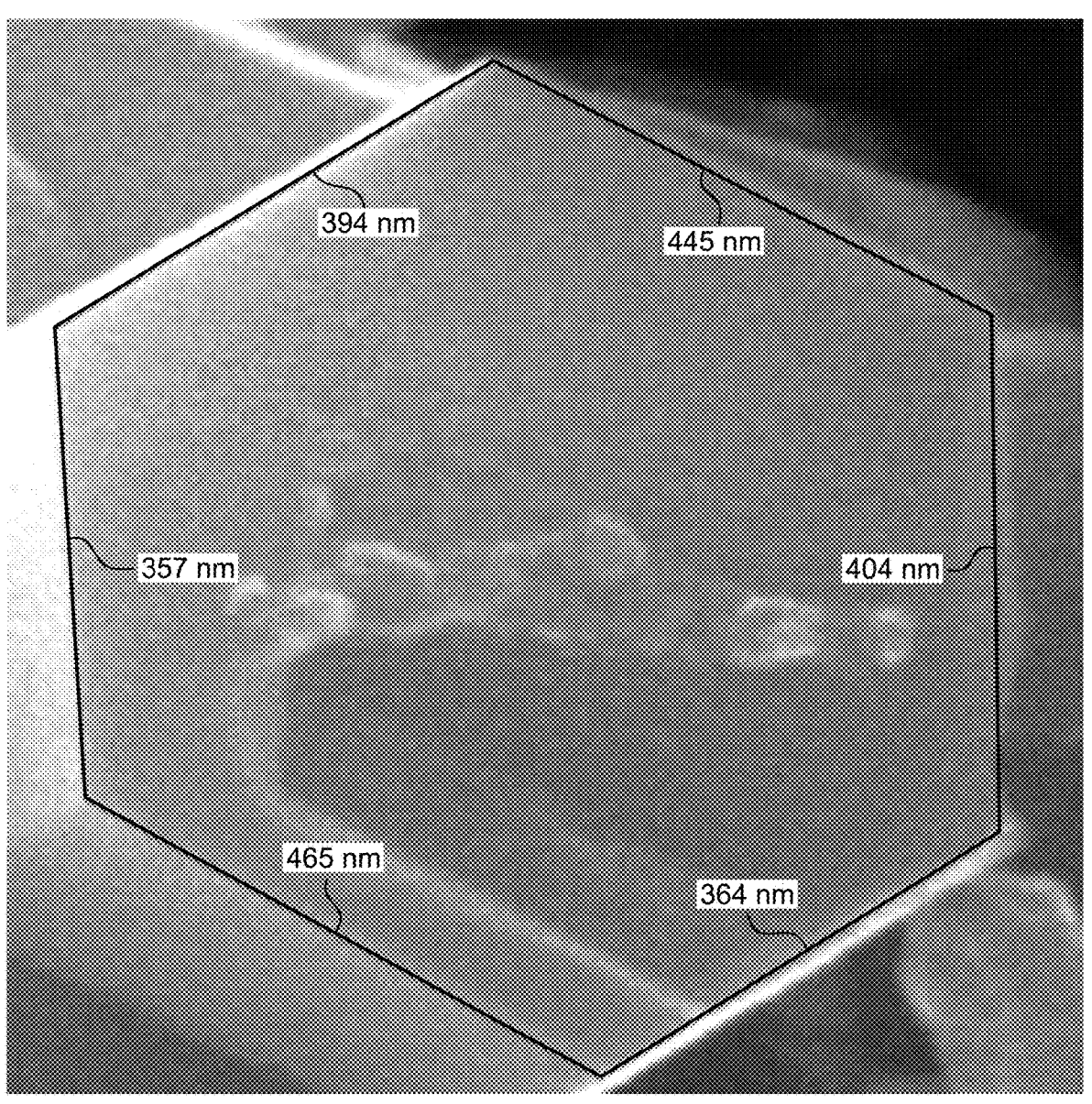
FIG. 2C is a high-resolution FESEM micrograph depicting a hexagonal face of ZnO-NS, according to certain embodiments.
Figure 2D:
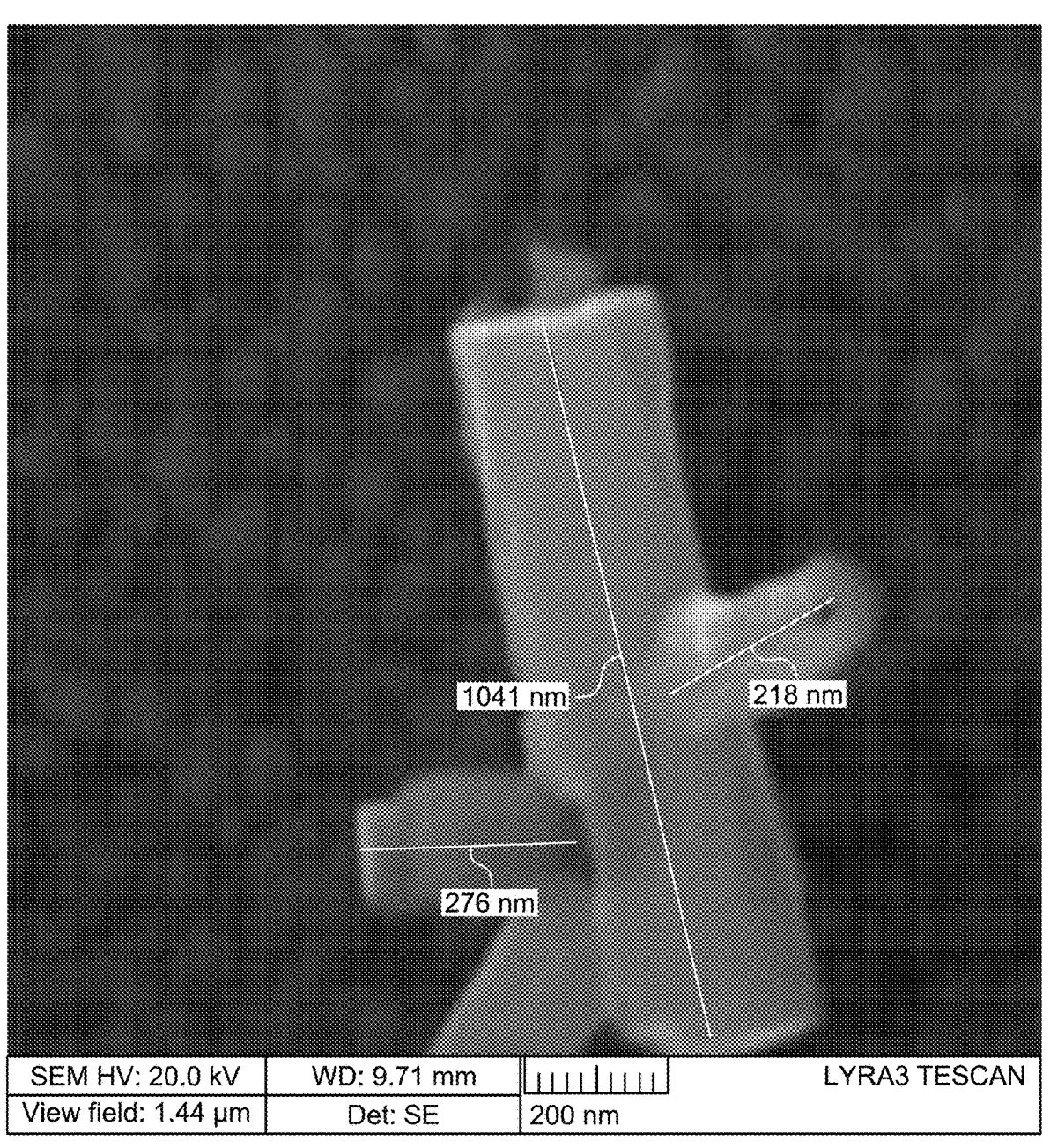
FIG. 2D depicts a high-resolution FESEM micrograph of ZnO-NS, according to certain embodiments.

The ZnO-NS was found to be of different lengths with hexagonal faces at the two ends, as shown in FIGS. 2A-2D. FIG. 2A is a low-resolution FESEM micrograph of ZnO-NS depicting the variation in lengths and sizes of the ZnO-NS. FESEM-aided energy dispersive X-ray spectroscopy (EDS) investigations were carried out to confirm the constituent elements of ZnO-NS on indium tin oxide (ITO) substrate, as shown in the inset of FIG. 2A. The inset of FIG. 2A represents FESEM-aided EDS spectrum and confirms the presence of Zn at 1.012 electron volts (eV) (La) and 8.63 eV (Ka) and O at 0.525 eV (Ka). Three additional peaks appeared at 1.739 eV (Ka), 3.286 eV (La), and 3.443 eV (La) that correspond to Si, In, and Sn in the ITO substrate, respectively. Further details of ZnO-NSs have been determined by carrying out using high-resolution FESEM, as shown in FIG. 2B. It was observed that edges of ZnO-NS were sharp and mostly hexagonal. Dimensions of the hexagonal edges were noted to be 445 nm, 404 nm, 364 nm, 465 nm, 357 nm, and 394 nm, as shown in FIG. 2C. FIG. 2C is a zoomed-in view of a small area (700 nm×700 nm) as marked by the solid square in FIG. 2B. A typical ZnO-NS along with several small segments further confirmed typical lengths of about 1041 nm, 276 nm, and 218 nm, as shown in FIG. 2D. FIG. 2D depicts a high-resolution FESEM micrograph of several individual ZnO-NS. The surface of the ZnO-NS and the hexagonal edges were found to be mostly smooth.

Figure 3A:
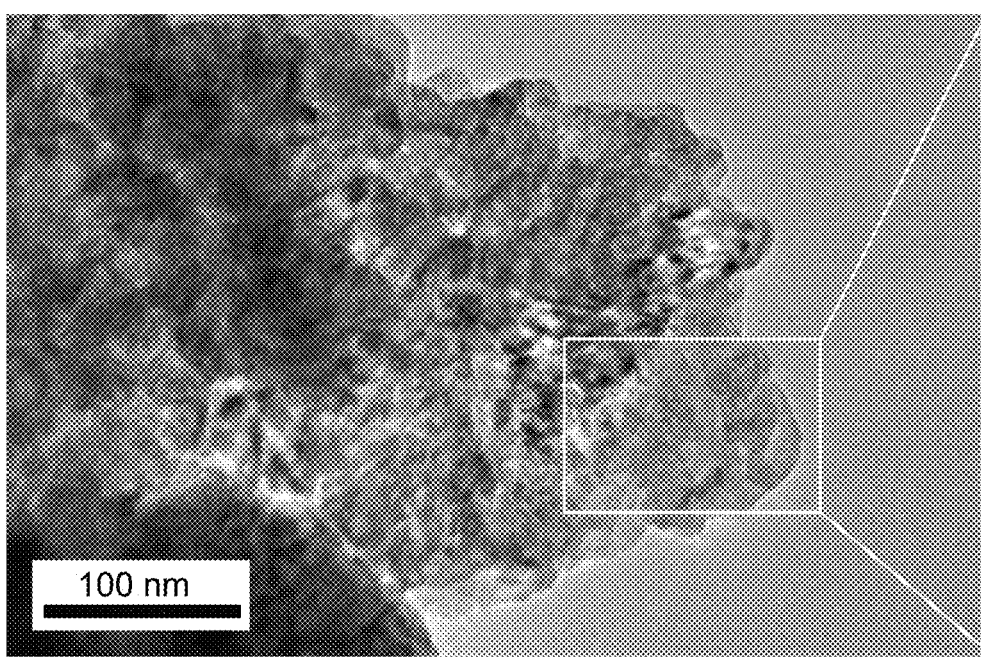
FIG. 3A depicts a transmission electron microscopy (TEM) micrograph of ZnO-NS, according to certain embodiments.
Figure 3B:
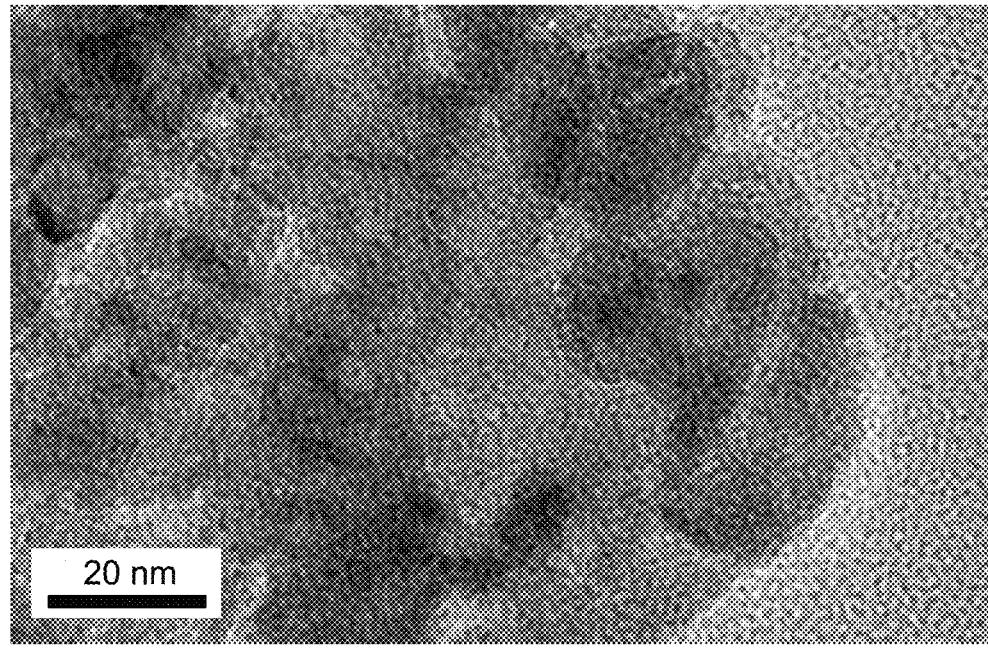
FIG. 3B depicts a high-resolution transmission electron microscopy (HRTEM) micrograph of ZnO-NS, according to certain embodiments.
Figure 3C:
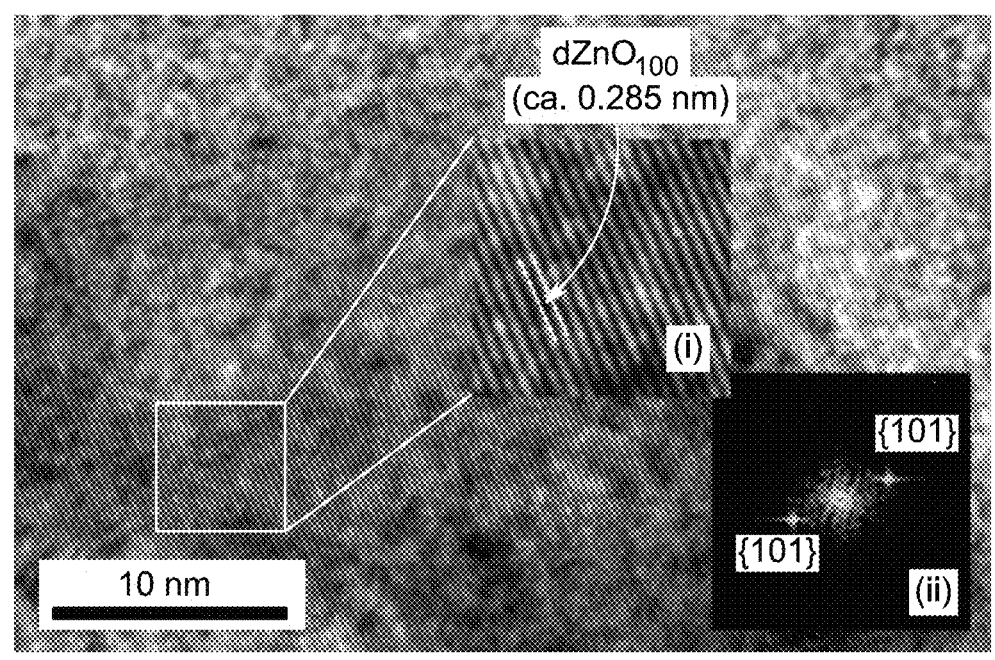
FIG. 3C depicts an HRTEM micrograph of ZnO-NS, according to certain embodiments.
Figure 3D:
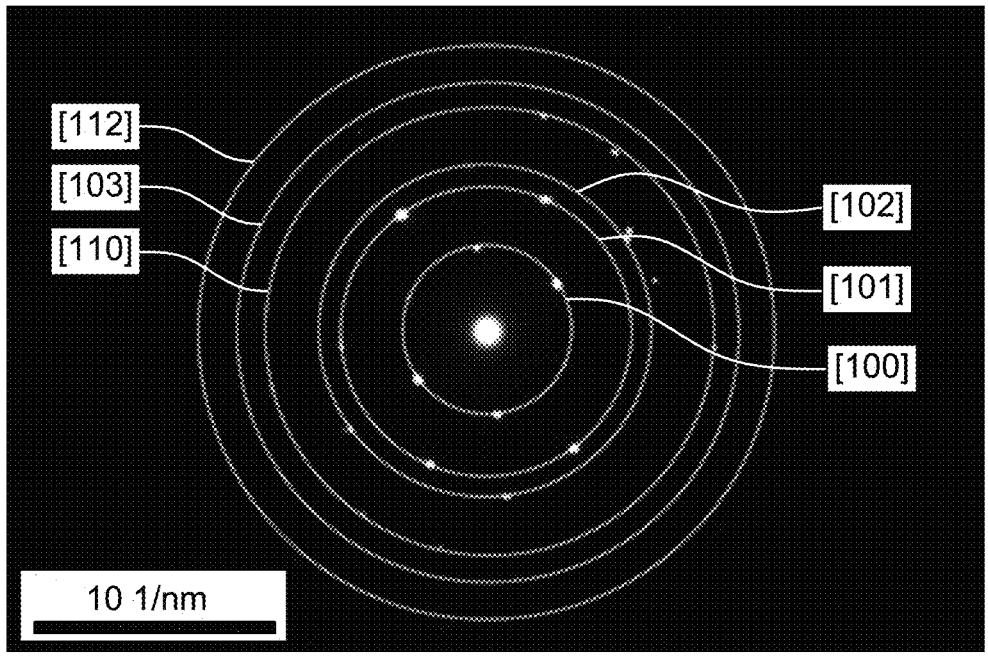
FIG. 3D depicts a selected area electron diffraction (SAED) pattern of ZnO-NSs, according to certain embodiments.

As mentioned in FIGS. 2A-2D, the as-synthesized ZnO-NS was noted to have a variety of sizes, although the lateral axis was facilitating a growth direction of the same. A TEM study was done to understand nanoscopic features of the ZnO-NS and is demonstrated in FIGS. 3A-3D. A TEM micrograph of ZnO-NS is shown in FIG. 3A. As seen in FIG. 3B, a portion of the ZnO-NS was examined further using HRTEM measurements. FIG. 3B depicts an HRTEM micrograph with many nanocrystallines of varying sizes; however, the resolution was not good enough to comprehend the lattice fringes and reveal the fringe spacing and planes of ZnO-NS. A further HRTEM micrograph of ZnO-NS is shown in FIG. 3C. According to the JCPDS 36-1451 database, the lattice fringe spacing of 0.285 nm, as extracted in FIG. 3C, is in good agreement with the spacing of $\{100\}$ planes in the ZnO wurtzite structure. A zoomed-in section of FIG. 3C, indicated by the squares measuring 5 nm×5 nm, is displayed in inset (i) of FIG. 3C. The ZnO-NS is well-crystalline because of the matched lattice fringes with a spacing of 0.285 nm, as shown in the inset (i) of FIG. 3C. Inset (ii) of FIG. 3C represents a FFT image of the same marked by the square in FIG. 3B. Nanocrystal planes of $\{101\}$ of the wurtzite structure of ZnO was identified in the corresponding FFT image. An SAED pattern obtained of ZnO-NS is shown in FIG. 3D. As seen in FIG. 3D, the strong diffraction spots verified the crystallinity of the ZnO-NS. These dots were observed to be mostly grouped in rings. As seen in FIG. 3D, the concentric rings in the zero order Laue zone were drawn and overlapped with the SAED bright spots considering a continuous angular distribution of (hkl) spots at a distance of $1/d_{hkl}$ from the (000) spot. It is known that the radius of the ring, r(hkl), and the interplanar lattice spacing, d(hkl), are related by equation 1 [Asadabad, M. A. and Eskandari, M. J., Electron diffraction, *Modern electron microscopy in physical and life sciences,* 2016, 3-25, which is incorporated herein by reference in its entirety]:

$$r(hlk) \times d_{hkl} = L\lambda \quad \text{(Eq. 1)}$$

where $L\lambda=1$ is the camera constant of the TEM.

From the SAED pattern, radii were estimated and lattice spacings were calculated according to equation 1. The d-values estimated from the experimental SAED pattern were found to be 2.820 Å, 1.641 Å, 1.437 Å, 1.61 Å, 0.948 Å, and 0.832 Å, corresponding to the planes $\{100\}$, $\{101\}$, $\{102\}$, $\{110\}$, $\{103\}$ and $\{112\}$, respectively. These values coincided well with the wurtzite phase of ZnO (JCPDS 36-1451) with space group of P63mc.

Figure 4A:
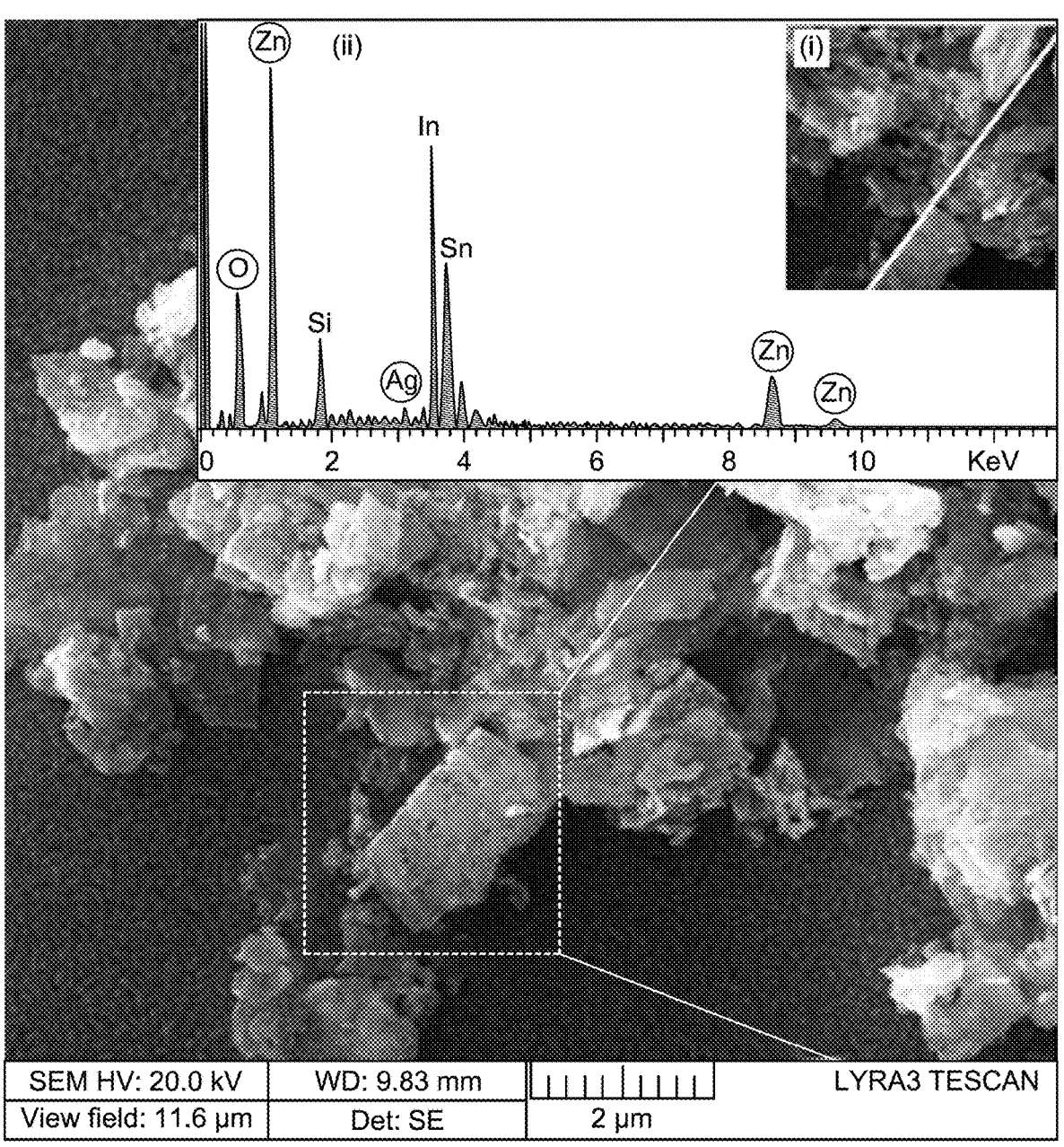
FIG. 4A is a scanning electron microscope (SEM) image and an EDS spectrum of Ag-NPs@ZnO-NS, according to certain embodiments.

AgNO$_3$ is known to be an oxidizer as well as a catalyst to the formation of Ag-NPs [Quino, C. G. P. et al., Dual Role of AgNO$_3$ as an Oxidizer and Chloride Remover toward Enhanced Combustion Synthesis of Low-Voltage and Low-Temperature Amorphous Rare Metal-Free Oxide Thin-Film Transistors, ACS Applied Electronic Materials, 2024, 6, 1, 505-513; and Hossain, M. K. et al., Fabrication and characterizations of arbitrary-shaped silver nanoparticles for surface-enhanced fluorescence microscopy, Journal of Nanoparticle Research, 2021, 23, 1-14, which are incorporated herein by references in their entireties]. Growth characteristics, chances of impregnation, solubility, reactivity, and surface morphology can be affected by the participating metal precursor. In this intant, as explined in experimental section, a silver nitrate (AgNO$_3$) precursor was employed to incorporate Ag-NPs within the ZnO-NS. The Ag-NPs@ZnO-NS in aqueous solution was synthesized following a high temperature treatment in an autoclave. With reference to ZnO-NS, the resulting Ag-NPs@ZnO-NS was porous and delicate, as illustrated in FIGS. 4A-4G. FIG. 4A depicts an SEM micrograph of Ag-NPs@ZnO-NS showing different shape and sizes of the nanostructure. Due to resolution constrain of SEM measurements, it was not possible to visualize Ag-NPs, although TEM investigation revealed that Ag was incorporated within ZnO-NS as nanoparticles instead of doping. Constituent elements in Ag-NPs@ZnO-NS were confirmed by SEM-aided EDS measurements as shown in the inset of FIG. 4A. A site of interest, as shown in the inset (i) of FIG. 4A, was selected for FESEM-aided EDS measurements. Inset (ii) of FIG. 4A displays an EDS spectrum confirming the characteristic L (2.98 keV) emission lines of Ag and characteristic L (8.65 and 9.50 keV) and M (1.01 keV) emission lines of Zn. The EDS peaks at 0.53 keV, 3.50 keV, and 3.75 keV represent O, In, and Sn of the ITO substrate, respectively.

Figure 4B:
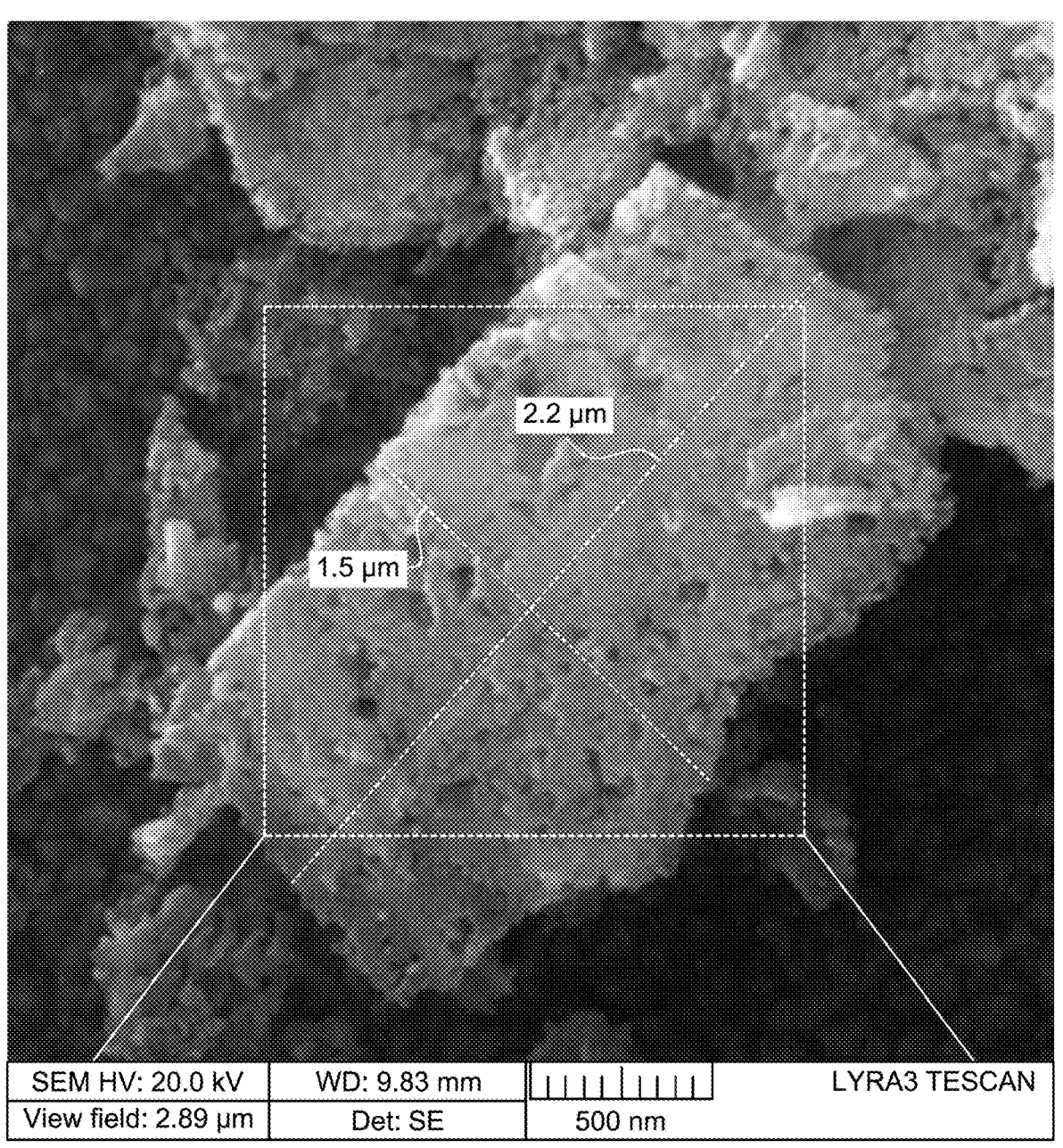
FIG. 4B is a high-resolution FESEM image of Ag-NPs@ZnO-NS, according to certain embodiments.
Figure 4C:
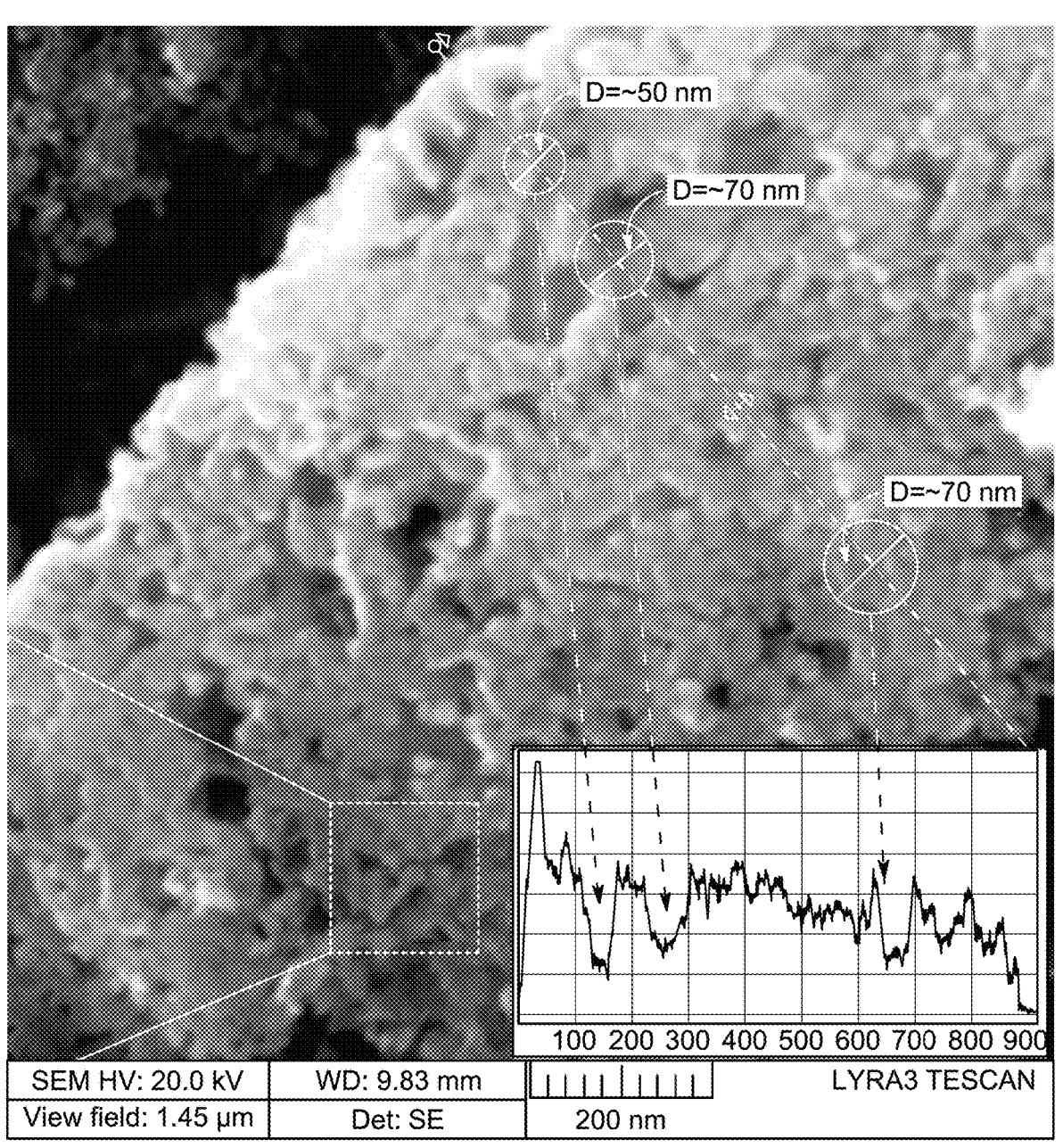
FIG. 4C is a high-resolution FESEM image and a surface topographic feature of Ag-NPs@ZnO-NS, according to certain embodiments.
Figure 4D:
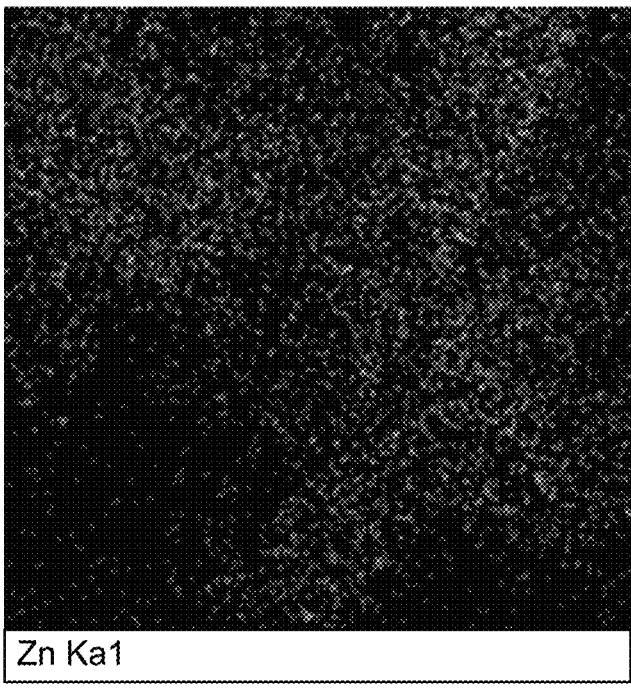
FIG. 4D is an FESEM-aided EDS mapping of Ag-NPs@ZnO-NS depicting zinc (Zn), according to certain embodiments.
Figure 4E:
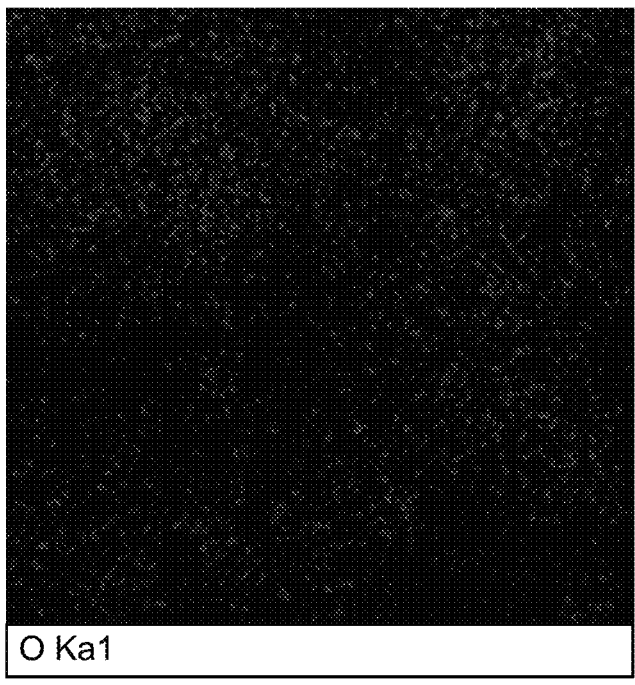
FIG. 4E is an FESEM-aided EDS mapping of Ag-NPs@ZnO-NS depicting oxygen (O), according to certain embodiments.
Figure 4F:
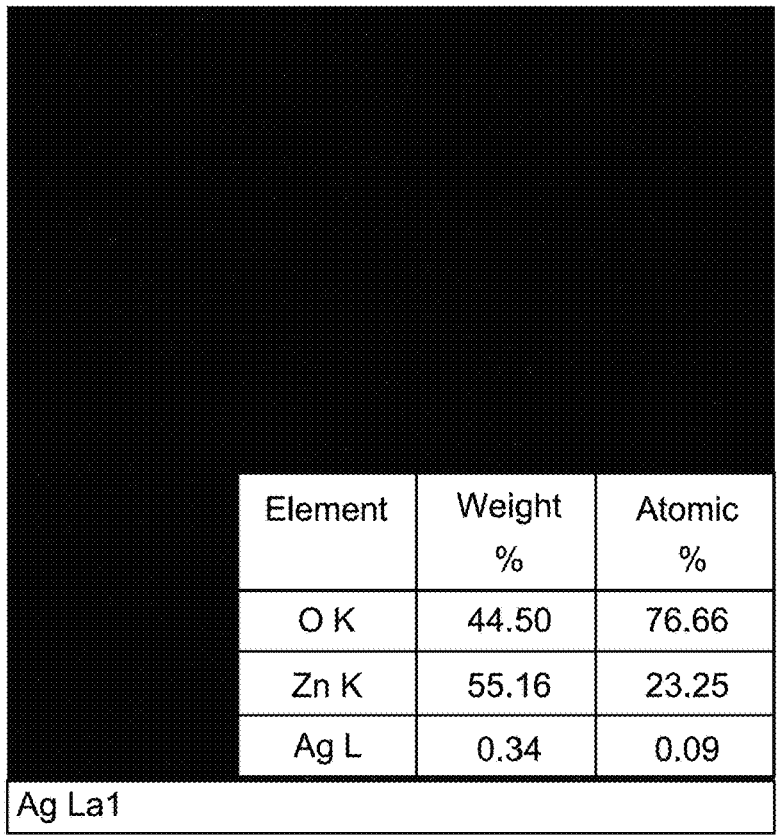
FIG. 4F is an FESEM-aided EDS mapping of Ag-NPs@ZnO-NS depicting silver (Ag) with weight percentages and atomic percentages of O, Zn, and Ag in Ag-NPs@ZnO-NS, according to certain embodiments.
Figure 4G:
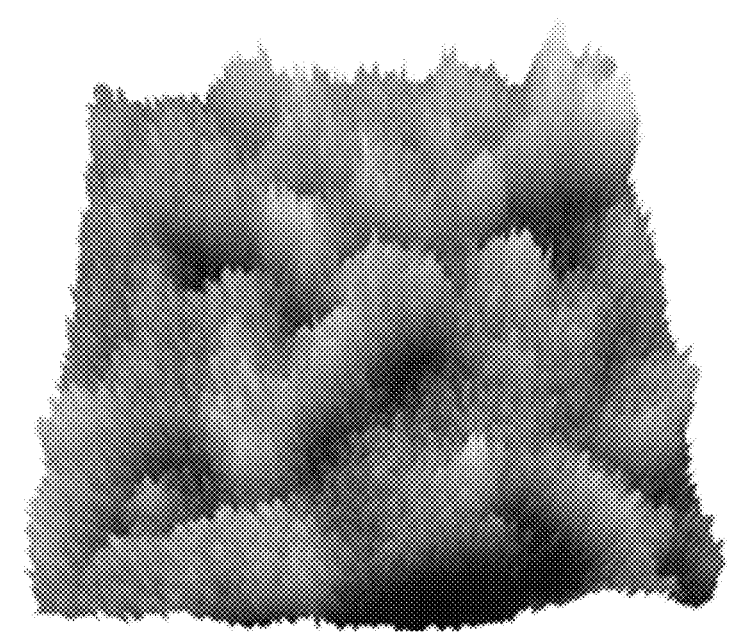
FIG. 4G is a three-dimensional (3D) hawk-eye view of Ag-NPs@ZnO-NS, according to certain embodiments.

High-resolution FESEM investigations of Ag-NPs@ZnO-NS revealed that the surface of the ZnO-NS turned into porous in presence of AgNO$_3$, as shown in FIG. 4B. The long and short axes of Ag-NPs@ZnO-NS were estimated to be about 2.2 μm and 1.5 μm, respectively, as shown in FIG. 4A. From the topographic confirmation it was not possible to identify any Ag-NPs within the ZnO-NS, although the EDS spectrum and corresponding mappings confirmed the present of Ag in the specimen, as shown in FIGS. 4D-4F. FIGS. 4D-4F represent EDS mappings corresponding to the constituent elements Zn, O, and Ag, respectively, recorded at the site shown in the inset (i) of FIG. 4A. Zn and O elements were noted to be homogenously distributed over the nanostructures, as observed in FIG. 4D and FIG. 4E, respectively. The emission line of the Ag element was also noticed to be uniformly distributed, although the intensity was lower than those of Zn and O elements. A reason may be related to the incorporation of low quantity of Ag-NPs within the ZnO matrix, as observed in the quantitative analysis of FESEM-EDS of the same. The inset of FIG. 4F represent the weight and atomic percentages of the constituent elements O, Zn and Ag in the Ag-NPs@ZnO-NS.

It was apparent that the metal precursor, such as AgNO$_3$, catalyzed the ZnO-NS and turned the surface porous. Such porous nanostructure facilitates increased sites of adsorption for the detection of the analyte by SERS. The porous nanostructure on the surface of the Ag-NPs@ZnO-NS was further investigated by high-resolution FESEM, as shown in FIG. 4C. FIG. 4C displays a small section (1.5 μm×1.5 μm) as marked by the square in FIG. 4B over an individual Ag-NPs@ZnO-NS. The hills and dips of the porous feature of the Ag-NPs@ZnO-NS were noticed. A line profile along the dotted line in FIG. 4C highlighted three typical nanopores and was shown in the inset of FIG. 4C. The diameters of the nanopores were estimated to be about 50 nm, about 70 nm, and about 80 nm, as indicated in FIG. 4C and corresponded to the dips shown in the inset of FIG. 4C. A 3D hawk-eye view of a small area (200 nm×200 nm) as marked by the square in FIG. 4C was further analyzed and shown in FIG. 4G.

This feature of the Ag-NPs@ZnO-NS was found to achieve higher enhancement in SERS-activity, provided that the plasmonic flavor from Ag-NPs did play the right role in the right place. Due to the resolution constrain of FESEM, it was difficult to visualize Ag-NPs, although confirmation of incorporation of Ag-NPs in the ZnO-NS has been demonstrated in an HRTEM investigation. In a SERS study, the porous nanostructures did facilitate higher adsorption of a target analyte along with sites of plasmon localization and provided higher SERS enhancement. Strong SERS-activity was observed in the presence of Ag-NPs@ZnO-NS.

Figure 5A:
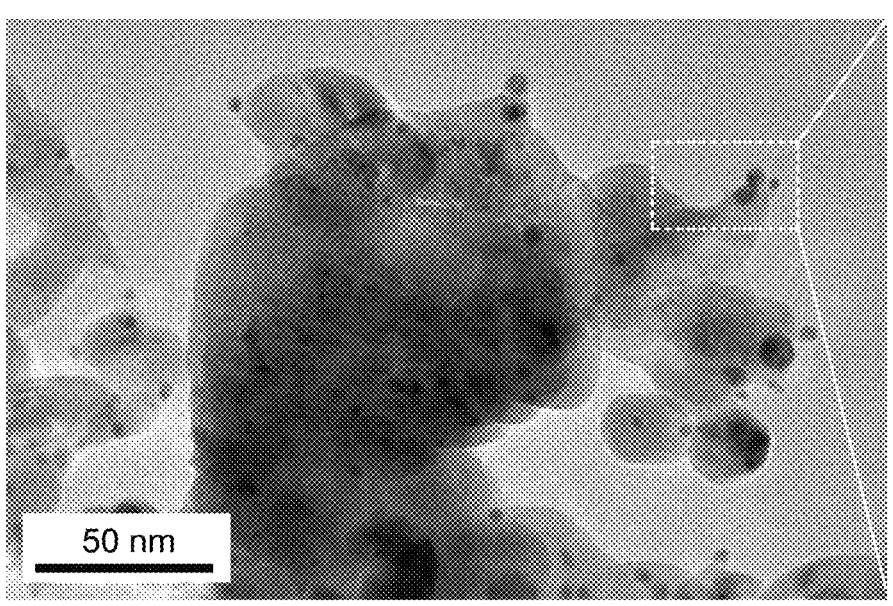
FIG. 5A is a TEM micrograph of Ag-NPs@ZnO-NS, according to certain embodiments.
Figure 5B:
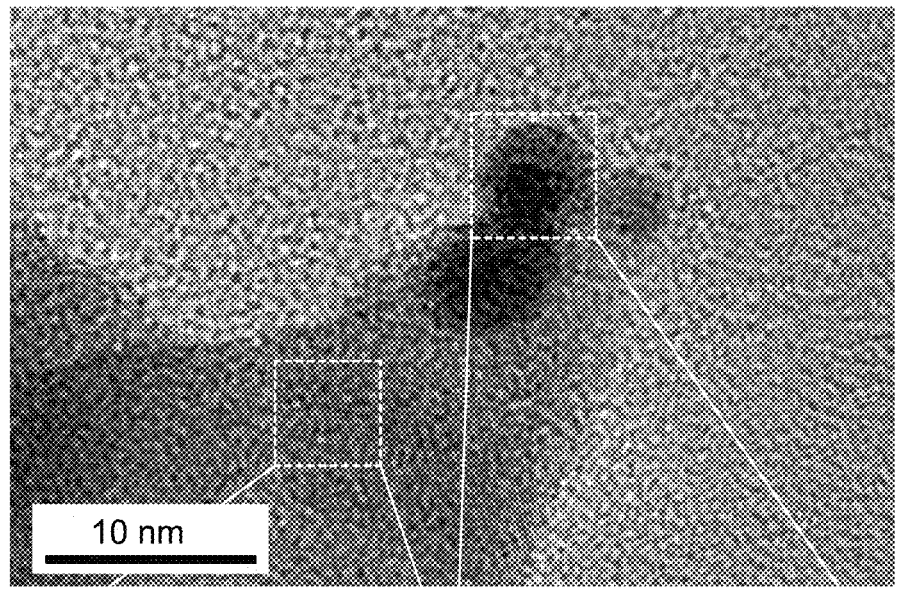
FIG. 5B is an HRTEM micrograph of Ag-NPs@ZnO-NS, according to certain embodiments.
Figure 5C:
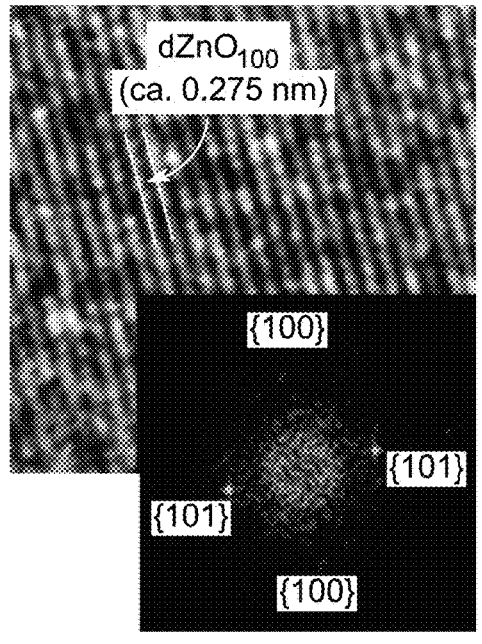
FIG. 5C depicts a zoomed-in HRTEM micrograph of Ag-NPs@ZnO-NS, according to certain embodiments.
Figure 5D:
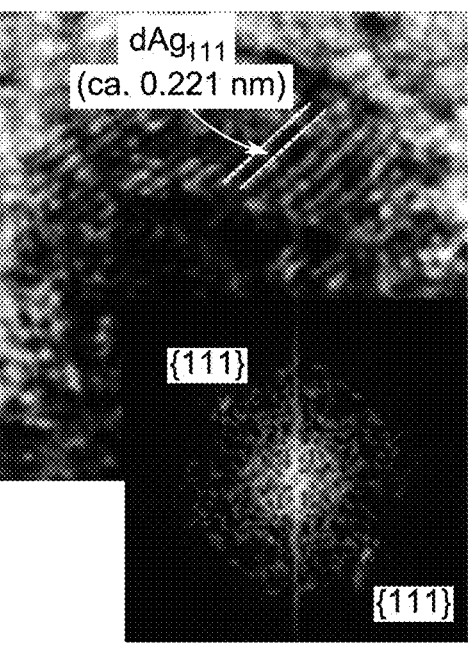
FIG. 5D depicts a zoomed-in HRTEM micrograph of Ag-NPs@ZnO-NS, according to certain embodiments.

TEM is known to capture images at a higher resolution than those observed in optical microscopes. In TEM, information is obtained from interactions between electrons and atoms in a sample, which may be used to capture the lattice fringes and visualize nanoparticles in their natural state. TEM investigations were carried out to qualitatively comprehend incorporation of Ag-NPs within the ZnO-NS, as shown in FIGS. 5A-5E. A site consisting of light and dark nanocrystals were investigated with TEM. FIG. 5A shows a TEM micrograph of Ag-NPs@ZnO-NS consisting of bright and dark sites. HRTEM imaging confirmed that the bright and dark sites correspond to nanocrystals of ZnO and Ag, respectively. FIG. 5B represents an HRTEM micrograph of a small segment (45 nm×30 nm) as marked by the rectangle in FIG. 5A. A small segment corresponding to a light site, as marked by the squares (5 nm×5 nm) in FIG. 5B, was zoomed-in and is shown in FIG. 5C. FIG. 5C indicates aligned lattice fringes of 0.275 nm spacings that coincide with the spacing of {100} planes in the wurtzite structure of ZnO, as per the database of JCPDS 36-1451. FFT technique plays a role in understanding the nanostructure and properties of materials at the atomic and nanoscale level. This allows for the identification of periodic structures, crystallographic information, and determination of crystal orientations, as shown in the inset of FIG. 5C. The inset of FIG. 5C represents an FFT image of a small segment of an HRTEM image, as marked by the square in FIG. 5B. The nanocrystal planes of {100} and {101} of the wurtzite structure of ZnO were identified in the corresponding FFT image. A small segment corresponding to a dark site, as marked by the squares (5 nm×5 nm) in FIG. 5B, was zoomed-in and is shown in FIG. 5D. FIG. 5D indicates lattice fringes of 0.221 nm spacing that coincide with the spacing of {111} planes of a face-centered-cube (FCC) structure of Ag-NPs, as per the database of JCPDS 04-0783. The Ag-NPs of about 5 nm in diameter were incorporated within the ZnO-NS. The inset of FIG. 5D represents an FFT image of the small segment of HRTEM image, as marked by the square in FIG. 5B, pointing out the nanocrystal plane of {111} of the FCC structure of the Ag-NPs. The coexistence of Ag-NPs and the ZnO-NS was further analyzed qualitatively using the SAED pattern.

Figure 5E:
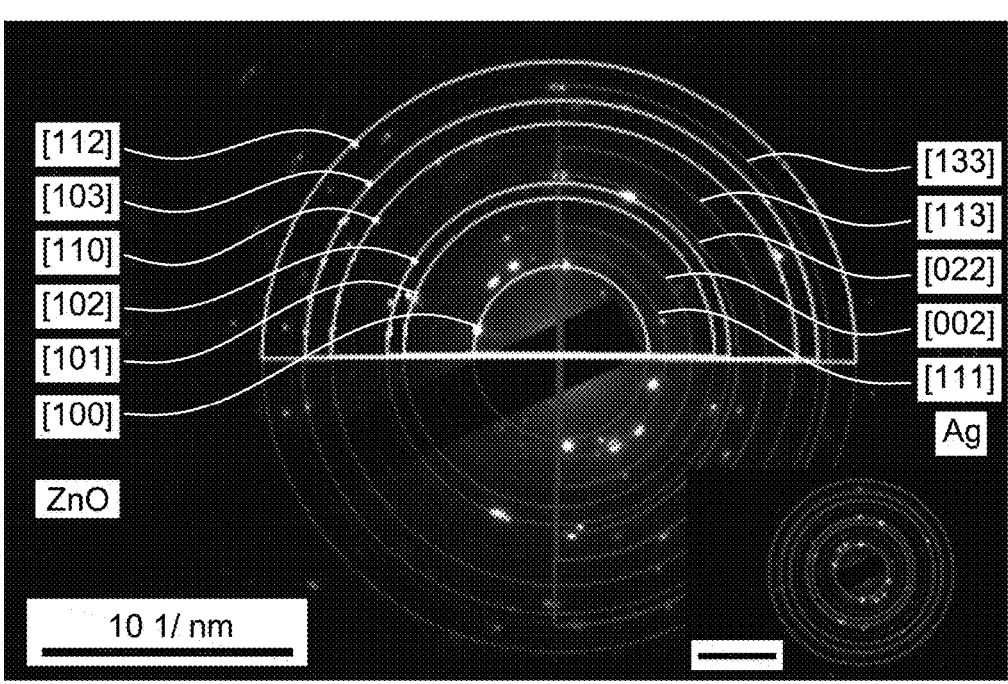
FIG. 5E depicts an SAED pattern of Ag-NPs@ZnO-NS, according to certain embodiments.

FIG. 5E shows an SAED pattern of Ag-NPs@ZnO-NS with bright spots. The crystallinity of Ag-NPs@ZnO-NS was confirmed by the bright diffraction spots, as observed in FIG. 5E. These spots were found to be arranged in rings, as mentioned in FIG. 5E. Concentric rings in the zero order Laue zone were produced and overlapped with SAED bright spots considering a continuous angular distribution of (hkl) spots at $1/d_{hkl}$ from the (000) spot. From the SAED pattern, radii were estimated and lattice spacings were calculated according to equation 1. The d-values estimated from the experimental SAED pattern were found to be 2.795 Å, 1.566 Å, 1.432 Å, 1.57 Å, 0.945 Å, and 0.829 Å corresponding to the planes {100}, {101}, {102}, {110}, {103}, and {112}, respectively. These values coincided well with the wurtzite phase of ZnO (JCPDS 36-1451) with space group P63mc. With reference to those d-values observed in the SAED pattern of ZnO-NS as mentioned in FIG. 3D, additional bright spots were observed. The d-values estimated for the additional bright spots from the experimental SAED pattern in the same frame were 2.394 Å, 2.4031 Å, 1.864 Å, 1.396 Å, 1.205 Å, and 0.930 Å corresponding to the planes {111}, {002}, {022}, {113}, and {133}, respectively. These values coincided well with a face-centered cubic (FCC) structure of crystalline Ag (JCPDS 04-0783). It was understood that Ag-NPs were incorporated within the ZnO-NS. Light dotted circles and dark dotted circles corresponding to lattice indices of ZnO-NS and Ag-NPs, respectively, were amended in FIG. 5C and FIG. 5D. The inset of FIG. 5C shows the filtered pattern of the same indicating the lattice indices corresponding to the spots.

Figure 6A:
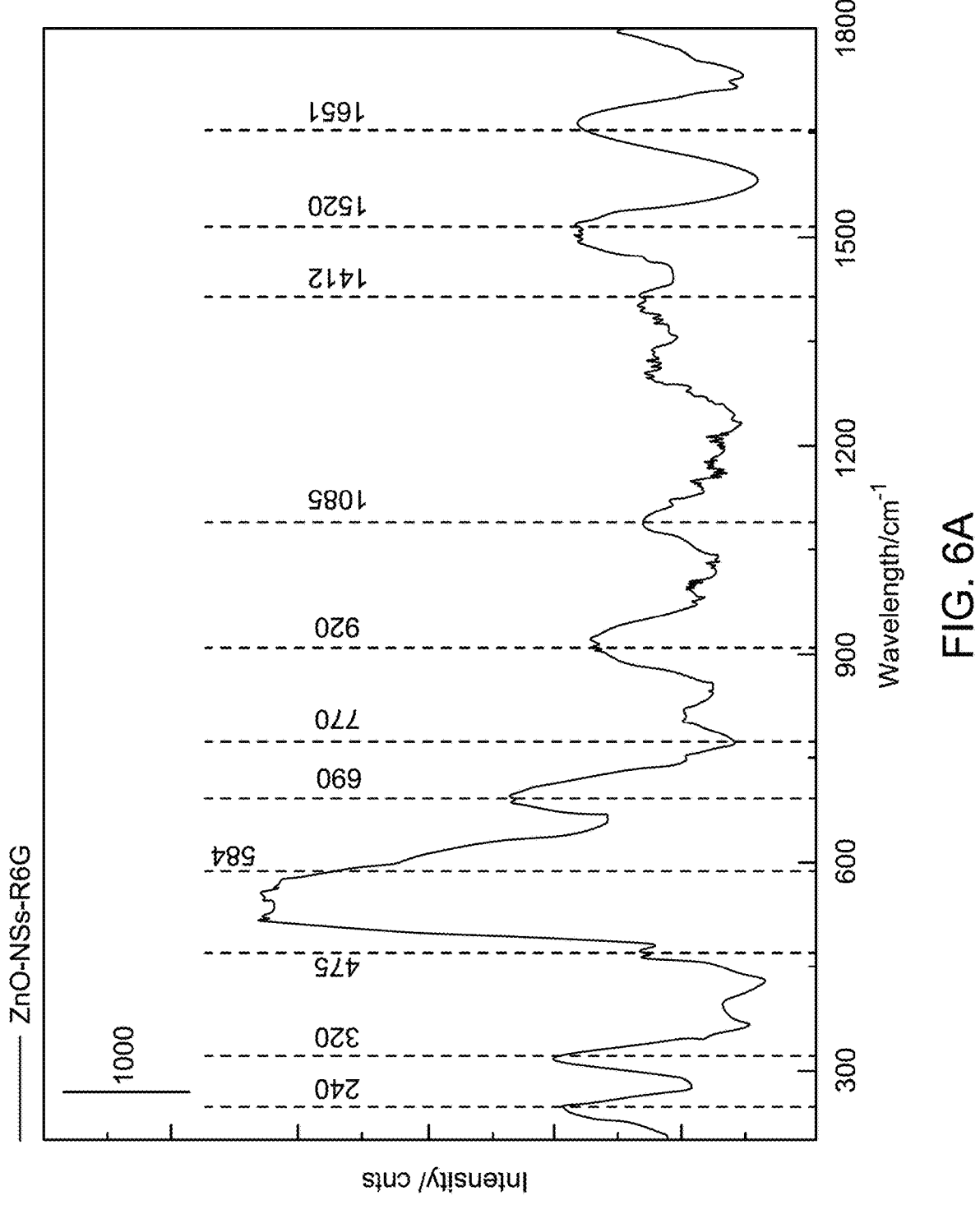
FIG. 6A depicts a surface-enhanced Raman spectroscopy spectrum of ZnO-NS adsorbed with R6G dyes, according to certain embodiments.
Figure 6B:
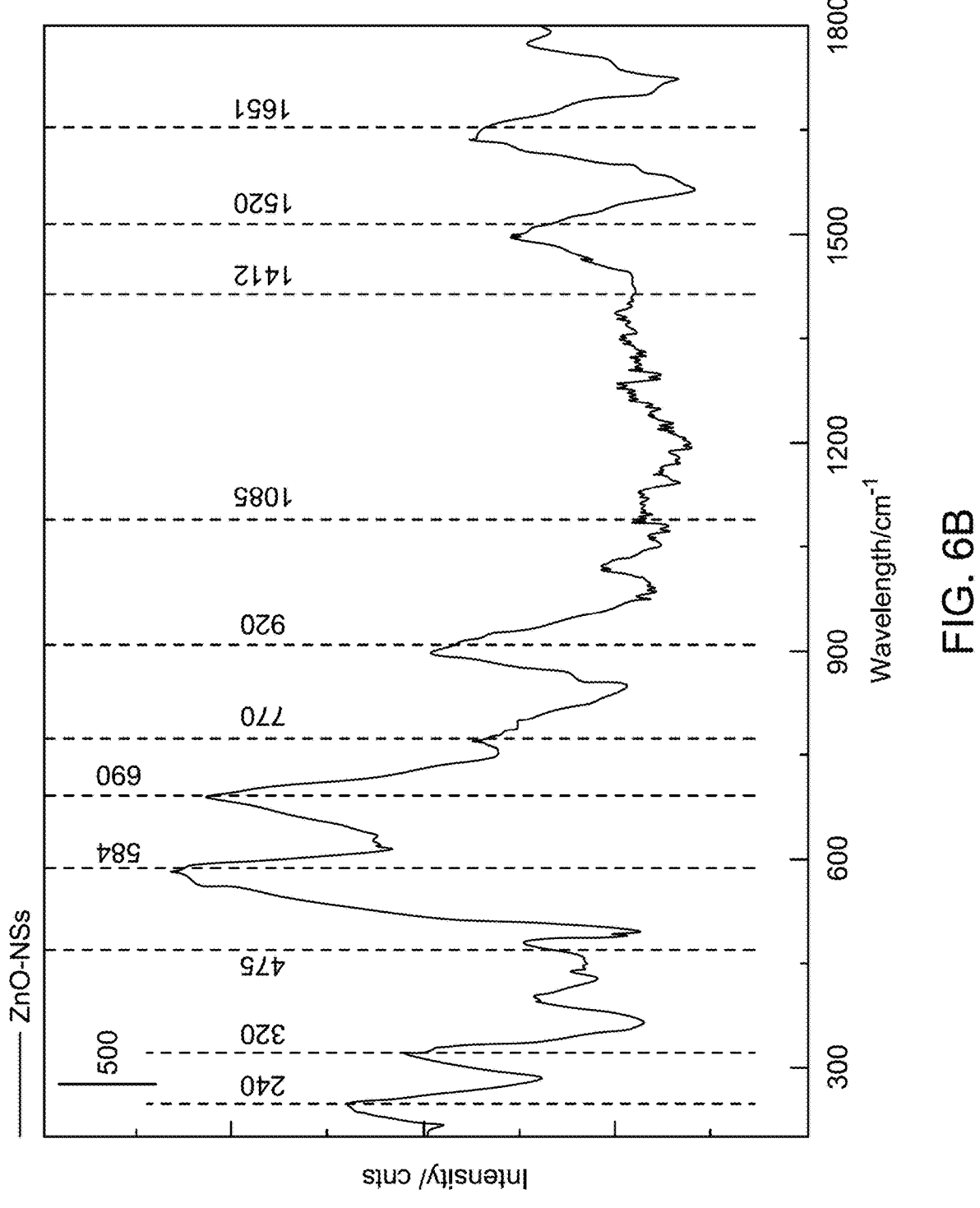
FIG. 6B depicts a Raman spectrum of ZnO-NS, according to certain embodiments.

Quantitative SERS-activity of Ag-NPs@ZnO-NS, with reference to those obtained at ZnO-NS, were analyzed. In SERS enhancement, two enhancement mechanisms, chemical enhancement (CE mechanism) and electromagnetic enhancement (EM mechanism), are the main mechanisms behind enhancement in the Raman scattering process. When excitation on noble metal nanostructures induces LSPRs, an elevated local electric field is created, which is the cause of the EM enhancement observed in SERS; however, due to the mismatch of the LSPR position in semiconductors, such as the ZnO mentioned earlier, the EM enhancement effects on ZnO nanostructures are much less than those on noble metals. A strategy has been developed to boost EM enhancement in ZnO nanostructures by incorporating noble metal nanoparticles, such as Ag-NPs, into the ZnO nanostructures. A strong enhancement combining the effect of EM and CE mechanisms has been evaluated. In this context, ZnO-NS and Ag-NPs@ZnO-NS have been incubated with a Raman active analyte and SERS-active has been investigated and is shown in FIGS. 6A-6D and FIGS. 7A-7D. FIG. 6A depicts the SERS spectra of R6G adsorbed on ZnO-NS and excited at 532 nm. No SERS band of R6G was observed. The bands observed in this case aligned well with Raman bands of the wurtzite phase of ZnO. As a reference, the Raman spectrum of ZnO-NS without any R6G was recorded as shown in FIG. 6B. Several Raman bands of ZnO, as shown in FIG. 6B, were observed. According to the group theory, wurtzite ZnO exhibits optical modes as per following equation:

$$\Gamma_{opt} = A_1 + 2B_1 + E_1 + 2E_2 \qquad \text{(Eq. 2)}$$

where, $A_1$, and $E_1$ represent symmetry polar phonons with different bands, transverse optics (TO)- and longitudinal optic (LO)-phonons. $E_2$ represents a symmetry non-polar mode with bands $E_{2L}$ and $E_{2H}$, where the $E_{2H}$ mode is associated with an oxygen sublattice and the $E_{2L}$ mode is attributed to the Zn sublattice. The $B_1$ modes are infrared and Raman inactive modes (known as silent modes). The low-frequency and high-frequency modes are dominated by acoustic overtones and a combination of optical overtones, respectively, whereas the intermediate-frequency modes are mostly a combination of acoustic and optical phonons.

Vertical dashed lines in FIG. 6A and FIG. 6B were amended to follow Raman bands. Raman bands observed are tabulated in Table 1 along with corresponding band assignments that coincided well with reported values [Sharma, A. et al., Effect of surface groups on the luminescence property of ZnO nanoparticles synthesized by sol-gel route, *Surface Science,* 2012, 606, 3-4, L13-L17; and Cuscó, R. et al., Temperature dependence of Raman scattering in ZnO, *Physical Review B,* 2007, 75, 16, 165202, which are incorporated herein by reference in their entireties]. Low frequency bands at shorter wavelengths, such as 240 cm$^{-1}$ and 320 cm$^{-1}$, represent a double tone of $E_{2L}$ and $E_2$ (TO), respectively, indicating a high crystallinity of the wurtzite phase of ZnO. The $E_{2H}$ Raman mode at 475 cm$^{-1}$ is correlated to the oxygen vibration and the $E_1$ (LO) mode present at 584 cm$^{-1}$ originating from 2$^{nd}$ order Raman scattering of the wurtzite phase of elongated ZnO. The Raman mode at 690 cm$^{-1}$ may be related to the transvers mode of symmetry polar phonon $E_1$(TO) of the wurtzite phase of ZnO. The Raman bands at 770 cm$^{-1}$, 920 cm$^{-1}$, and 1085 cm$^{-1}$ are reported to be the combination of acoustic and phonon modes of ZnO. The band at 770 cm$^{-1}$ represents $E_{2H}$ overlapped with $A_1$(TO) and the band at 920 cm$^{-1}$ represents $E_1$(TO) overlapped with $E_1$(LO). The wide band at 1085 cm$^{-1}$ may be related to the 2$^{nd}$ order mode of $A_1$(LO). The bands at 1412 cm$^{-1}$, 1520 cm$^{-1}$, and 1651 cm$^{-1}$ are not directly related to the ZnO, although these modes may be linked to molecular hydrocarbon and oxygen species. The band at 1412 cm$^{-1}$ and 1520 cm$^{-1}$ is reported to the stretching mode of $O_2^{2-}$ and $O_2$, whereas the band at 1651 cm$^{-1}$ is linked to the stretching mode of $CH_3$.

Figure 6C:
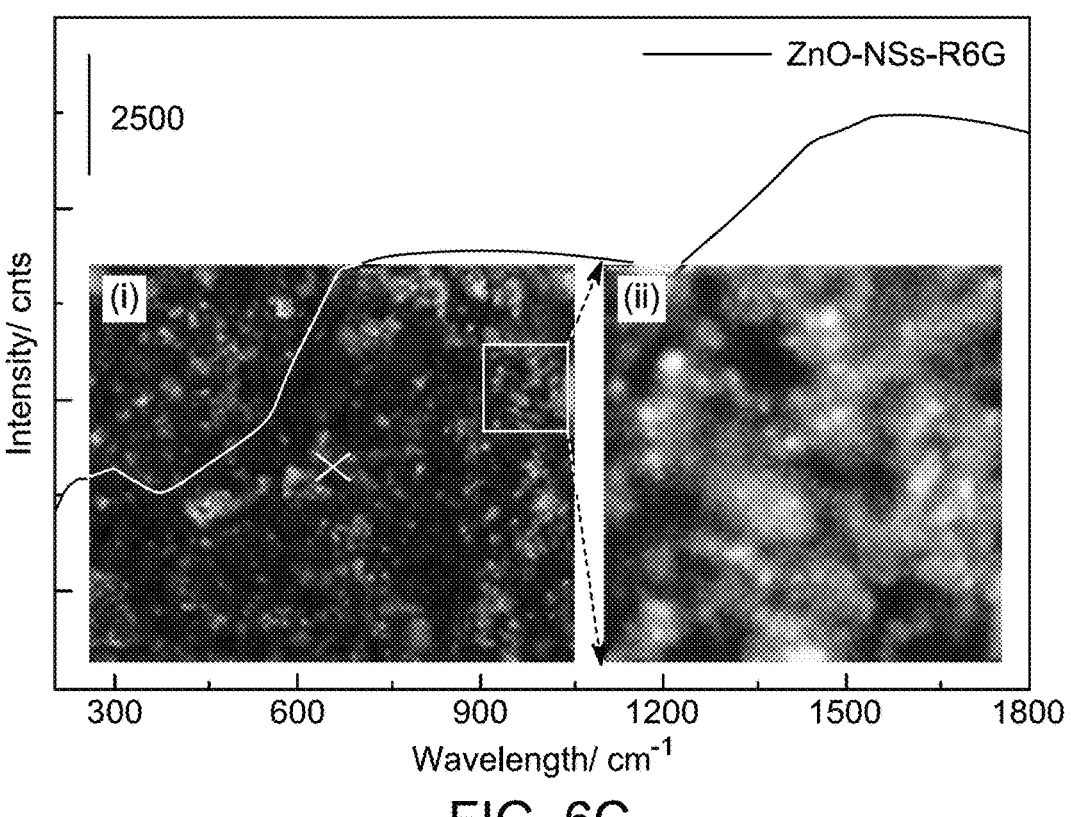
FIG. 6C depicts a background signal of ZnO-NS adsorbed with R6G dyes and charge-coupled device (CCD) images of ZnO-NS adsorbed with R6G dyes, according to certain embodiments.
Figure 6D:
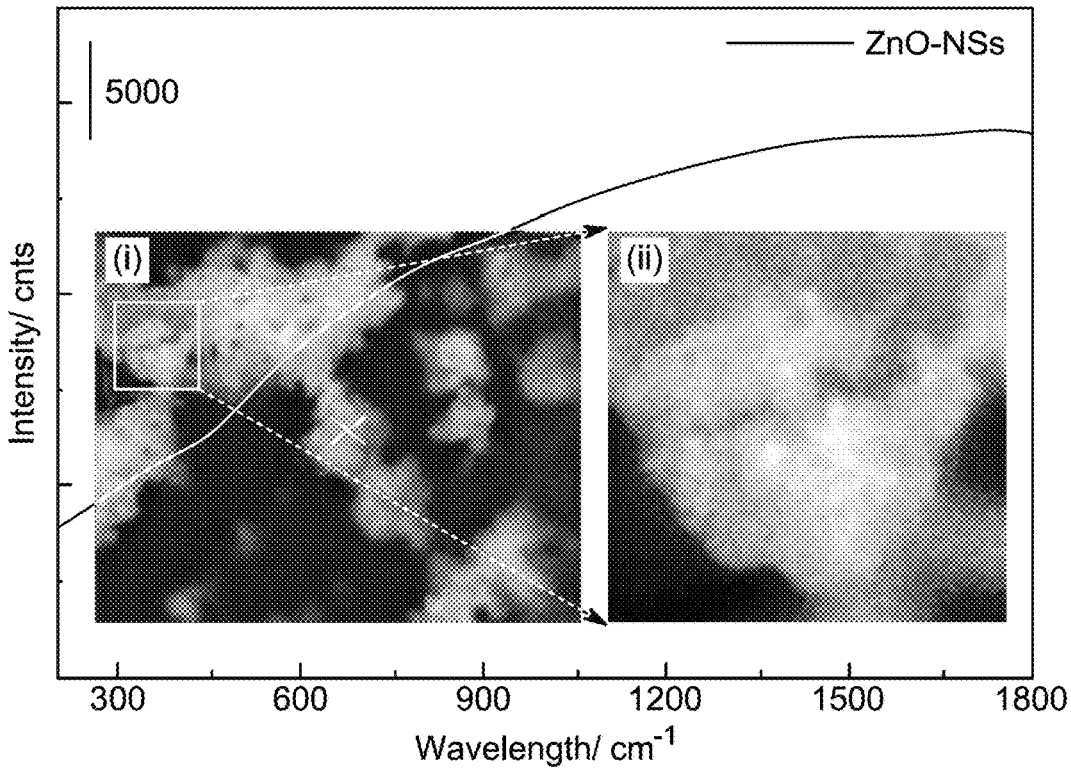
FIG. 6D depicts a background signal of ZnO-NSs and CCD images of ZnO-NS, according to certain embodiments.

The background emissions of SERS spectra of R6G on ZnO-NS and that observed in Raman spectra of ZnO-NS are shown in FIG. 6C and FIG. 6D. Inset (i) of FIG. 6C represents a charge-coupled device (CCD) image of the same specimen along with the focused spot marked by "x" used to obtain the SERS spectrum. No damage or burning was observed, as the intensity of lase excitation was maintained low. A zoomed-in view of a small segment, as marked by the square in the inset (i) of FIG. 6C, was further shown in the inset (ii) of the same. The bright spots observed therein were ZnO-NS. Raman measurements of ZnO-NS without any analyte were carried out and shown in FIG. 6B. The background emission in ZnO-NS without analyte was found to be higher than that observed in R6G-adsorbed ZnO-NS, as shown in FIG. 6D. Inset (i) of FIG. 6D displays a CCD image of the same specimen along with the focused spot marked by "x" used to obtain the Raman spectra. No damage or burning was observed. A zoomed-in view of a small segment, as marked by the square in the inset of FIG. 6D, was further shown in inset (ii) of the same. As described in the experimental part, the laser was shut off immediately following the measurement with a laser intensity of 25%.

TABLE 1

Raman modes recorded for Ag—NPs@ZnO—NS and
ZnO—NS specimens and corresponding band assignments

| Assignment of Vibrational modes | Raman Shift (cm$^{-1}$) |
|---|---|
| 2A$_1$(LO) | 1085 |
| E$_1$ (TO) + E$_1$ (LO) | 920 |
| E$_{2H}$ + A$_1$ (TO) | 770 |
| E$_1$ (TO) | 690 |
| E$_1$ (LO) | 584 |
| E$_{2H}$ | 475 |

TABLE 1-continued

Raman modes recorded for Ag—NPs@ZnO—NS and
ZnO—NS specimens and corresponding band assignments

| Assignment of Vibrational modes | Raman Shift (cm$^{-1}$) |
|---|---|
| E$_2$ (TO) | 320 |
| 2E$_{2L}$ | 240 |

Figure 7A:
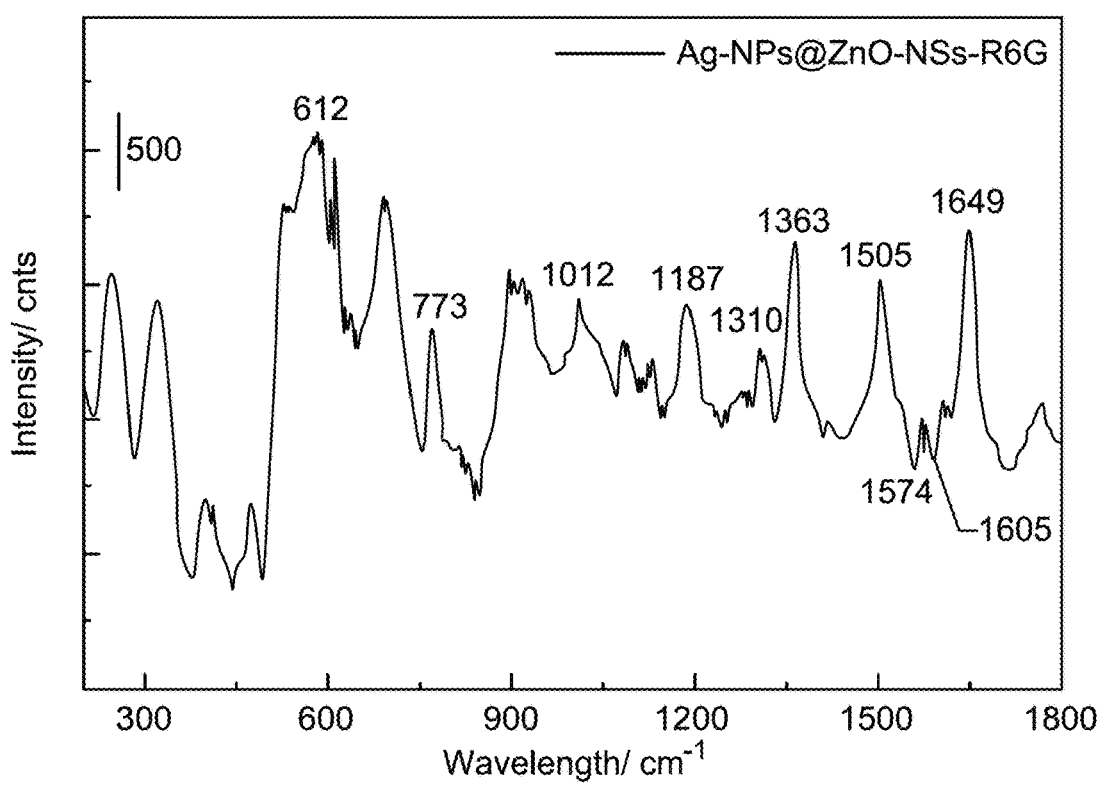
FIG. 7A depicts a surface-enhanced Raman spectroscopy spectrum of Ag-NPs@ZnO-NS adsorbed with R6G dyes, according to certain embodiments.
Figure 7B:
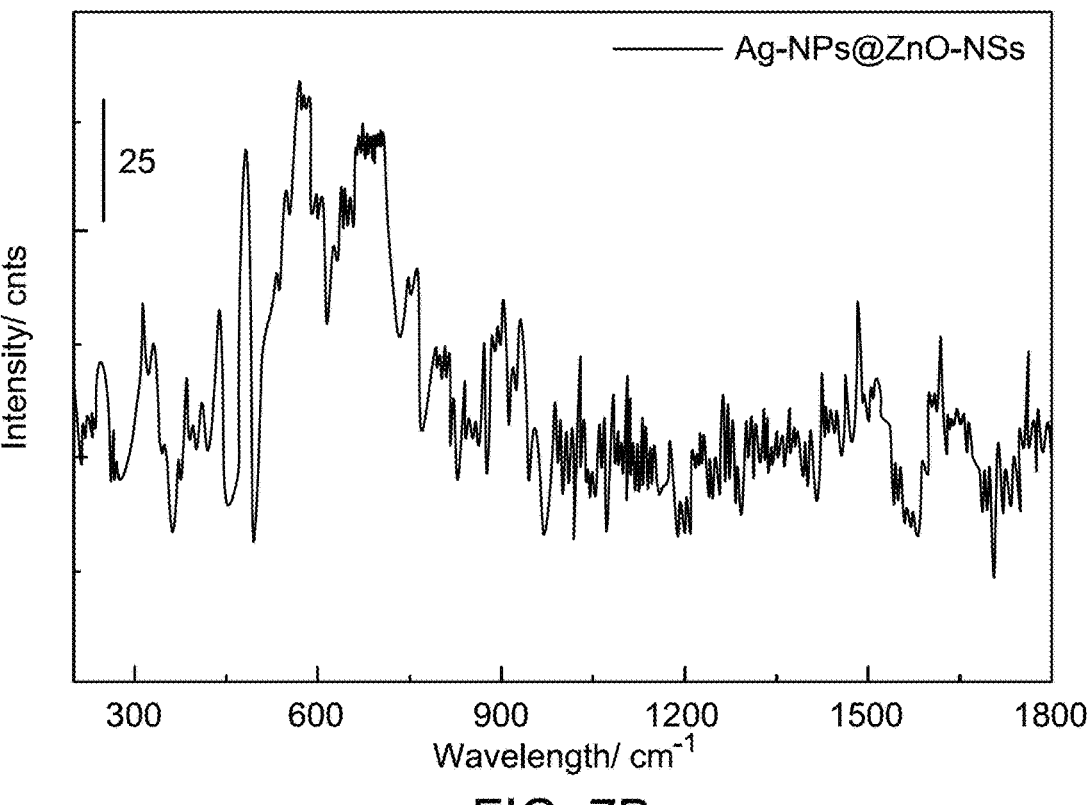
FIG. 7B depicts a Raman spectrum of Ag-NPs@ZnO-NS only, according to certain embodiments.

As demonstrated in FIGS. 5A-5E, HRTEM confirmed the existence of Ag-NPs within the matrix of ZnO-NS. Ag-NPs embedded in ZnO-NS may contribute to the SERS enhancement of R6G by activating ZnO-NS as a contributor in the enhancement. A strong enhancement in SERS was observed at Ag-NPs@ZnO-NS, as shown in FIGS. 7A-7D. FIG. 7A shows the SERS spectrum of R6G adsorbed on Ag-NPs@ZnO-NS excited at 532 nm. With reference to that observed in FIG. 6A, strong SERS bands of R6G were observed in this context, as amended in FIG. 7A. The SERS bands of R6G recorded are reported in Table 2 along with band assignments and corresponding reported and simulated values [Hayazawa, N. et al., Near-field Raman imaging of organic molecules by an apertureless metallic probe scanning optical microscope, *The Journal of chemical physics,* 2002, 117, 3, 1296-1301; and Watanabe, H. et al., DFT vibrational calculations of rhodamine 6G adsorbed on silver: analysis of tip-enhanced Raman spectroscopy, *The Journal of Physical Chemistry B,* 2005, 109, 11, 5012-5020, which are incorporated herein by references in their entireties]. Strong enhancement in SERS bands of R6G were noted on the top of Raman bands of ZnO. As a reference, the Raman spectrum of Ag-NPs@ZnO-NS without any R6G was recorded and is shown in FIG. 7B. Several Raman bands of ZnO, as indicated in FIG. 7B, were observed and all the bands coincide well with those observed in ZnO-NS, as shown in FIGS. 6A-6D. The SERS bands of R6G at 612 cm$^{-1}$, 773 cm$^{-1}$, and 1012 cm$^{-1}$ were related to out-plane bending mode of C—C. SERS bands at 1310 cm$^{-1}$, 1363 cm$^{-1}$, and 1649 cm$^{-1}$ represent a stretching mode of C—C in a xanthene ring. In-plane bending mode of C—H in a xanthene ring and a stretching mode of C—N in ethyl group (NHC$_2$H$_5$) were observed at 1187 cm$^{-1}$ and 1501 cm$^{-1}$, respectively. The hybrid mode (phenyl ring with COOC$_2$H$_5$) and stretching mode of C—C in phenyl ring were observed at 1605 cm$^{-1}$ and 1574 cm$^{-1}$, respectively.

Figures 7C, 7D:
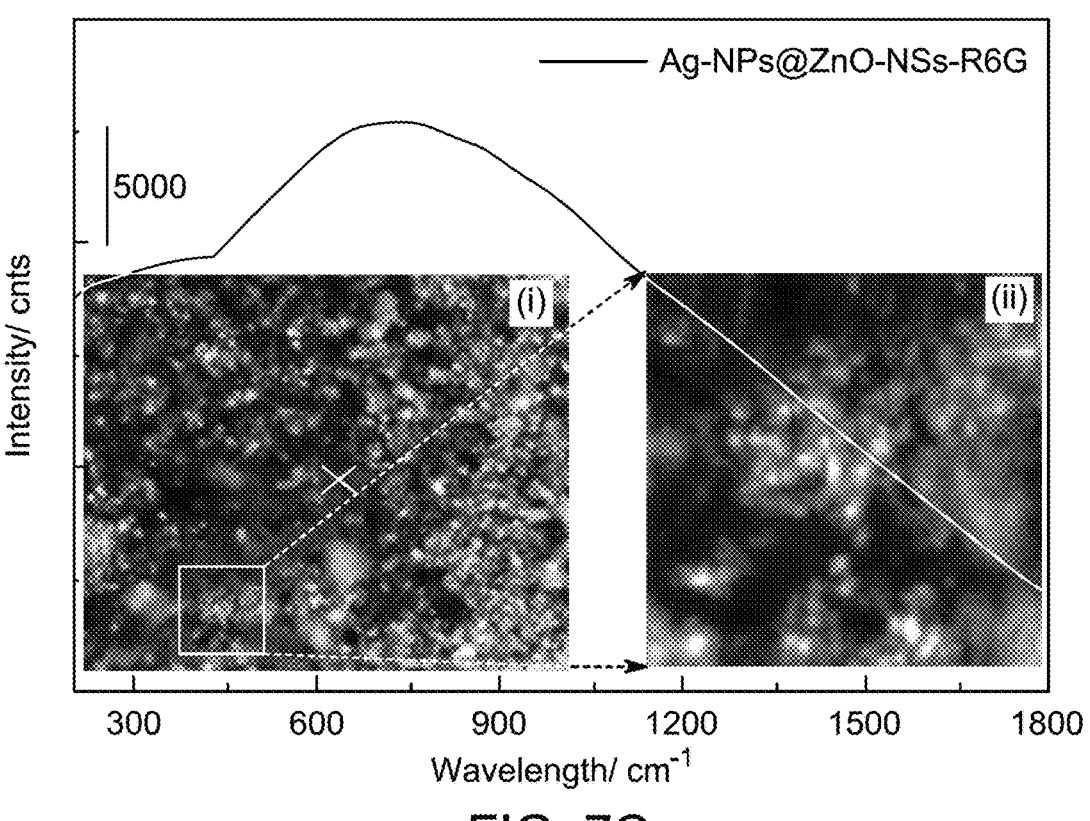
FIG. 7C depicts a background signal of Ag-NPs@ZnO-NS adsorbed with R6G dyes and CCD images of Ag-NPs@ZnO-NS adsorbed with R6G dyes, according to certain embodiments.
FIG. 7D depicts background signal of Ag-NPs@ZnO-NSs only and CCD images of Ag-NPs@ZnO-NSs only, according to certain embodiments.

SERS spectra of R6G on Ag-NPs@ZnO-NS and Raman spectrum of Ag-NPs@ZnO-NS obtained at 532 nm excitation showed a fluorescence background, as illustrated in FIGS. 7C and 7D. Inset (i) of FIG. 7C represents a CCD image of the same and the focused spot marked by "x" used to obtain the SERS spectra. No damage or burning was observed due to the low intensity of laser excitation. A zoomed-in view of a small segment, as marked by the square in the inset (i) of FIG. 7C, was further shown in the inset (ii) of FIG. 7C. The bright sites observed in the inset (ii) of FIG. 7C were Ag-NPs@ZnO-NS. Raman measurements of Ag-NPs@ZnO-NS without any R6G were carried out and are shown in FIG. 7B. The background emission in the Ag-NPs@ZnO-NS without any R6G was found to be lower than that observed in R6G-adsorbed Ag-NPs@ZnO-NS, as shown in FIG. 7D. Inset (i) of FIG. 7D displays a CCD image of the Ag-NPs@ZnO-NS without any R6G and the focused spot marked by "x." No damage or burning was observed. A zoomed-in view of a small segment as marked by the square in the inset (i) of FIG. 7D was further shown in the inset (ii) of the Ag-NPs@ZnO-NS without any R6G.

TABLE 2

SERS modes of R6G and corresponding enhancement factors (EF) recorded at
Ag—NPs@ZnO—NS construct and experimental and theoretical band assignments

| Assignment of vibrational mode | In this study $(cm^{-1})$ | Experimental $(cm^{-1})$ | Theoretical $(cm^{-1})$ | EF Factor |
|---|---|---|---|---|
| C—C stretching mode in xanthene ring | 1649 | 1648 | 1652 | $1.54 \times 10^6$ |
| Hybrid mode (phenyl ring with COOC$_2$H$_5$) | 1605 | 1595 | 1615 | $2.60 \times 10^5$ |
| C—C stretching mode in phenyl ring | 1574 | 1573 | 1577 | $4.69 \times 10^5$ |
| C—N stretching mode in NHC$_2$H$_5$ | 1505 | 1507 | 1505 | $2.16 \times 10^6$ |
| C—C stretching in xanthene ring | 1363 | 1359 | 1351 | $9.93 \times 10^5$ |
| C—C stretching in xanthene ring | 1310 | 1310 | 1307 | $9.04 \times 10^5$ |
| C—H in-plane bending in xanthene ring | 1187 | 1183 | 1192 | $8.31 \times 10^5$ |
| C—C out-plane bend | 1012 | 1088 | 1014 | $8.38 \times 10^5$ |
| C—C out-plane bend | 773 | 773 | 771 | $1.32 \times 10^6$ |
| C—C out-plane bend | 612 | 611 | 615 | $3.24 \times 10^5$ |

The calculated EF of R6G adsorbed on Ag-NPs@ZnO-NS is tabulated in Table 2. Given that thirteen SERS bands of R6G were seen, the following formula was used to estimate and compare EF for individual SERS bands:

$$EF = \left(\frac{I_{SERS}}{I_{bulk}}\right) \times \left(\frac{N_{bulk}}{N_{SERS}}\right) \qquad \text{(Eq. 3)}$$

where $I_{SERS}$ $I_{bulk}$, $N_{SERS}$, and $N_{bulk}$ represent the intensity of the SERS peak, the intensity of the Raman peak at a specific vibrational mode, the number of analytes in SERS, and the number of analytes in Raman measurements, respectively.

As shown in Table 2, the SERS enhancements for R6G at bands of 611 cm$^{-1}$, 773 cm$^{-1}$, 1012 cm$^{-1}$, 1187 cm$^{-1}$, 1310 cm$^{-1}$, 1363 cm$^{-1}$, 1505 cm$^{-1}$, 1574 cm$^{-1}$, 1605 cm$^{-1}$, and 1649 cm$^{-1}$ were determined to be about $3.24 \times 10^5$, $1.32 \times 10^6$, $8.38 \times 10^5$, $8.31 \times 10^5$, $9.04 \times 10^5$, $9.93 \times 10^5$, $2.161 \times 10^6$, $4.69 \times 10^5$, $2.60 \times 10^5$, and $1.54 \times 10^6$, respectively.

SERS is a technique that involves the enhancement of Raman scattering signals when analytes are near plasmonic surfaces. While the exact mechanism of the enhancement effect in SERS is still unknown, two preliminary enhancement mechanisms have been proposed: electromagnetic (EM) enhancement and chemical enhancement. The EM mechanism proposes that the Raman signals are enhanced as a result of the stimulation of localized surface plasmons on the surface plasmonic construct. This mechanism is centered on amplification of the EM field near nanoscale features of the plasmonic construct, leading to amplified Raman scattering. The chemical enhancement mechanism indicates that analytes and the plasmonic construct produce charge-transfer complexes, which intensify Raman signals on favorable conditions. The significance of charge transfer pathways between analytes and the plasmonic construct involved in the chemical enhancement is emphasized in this mechanism. While EM enhancement is the dominant factor in SERS, the CE can also contribute to the overall signal enhancement. Ag-NPs@ZnO-NS is a hybrid plasmonic structure that showed strong SERS enhancement through the EM mechanism as well as the CE mechanism. The EM mechanism has been extensively reported. The CE mechanism in SERS is more complex and less understood. It involves the formation of charge-transfer complexes and energy gap matching amongst the participating entities. The CE mechanism is based on the resonance of the incident photon energy with the molecular vibrations of the adsorbed analytes. The exact details of the chemical enhancement mechanism are still a matter of debate; however, the contributions caused by electron and charge transfer that occurs in any metal-analyte or metal-metal oxide-analyte system have been widely accepted as a part of the SERS enhancement processes.

Figure 8A:
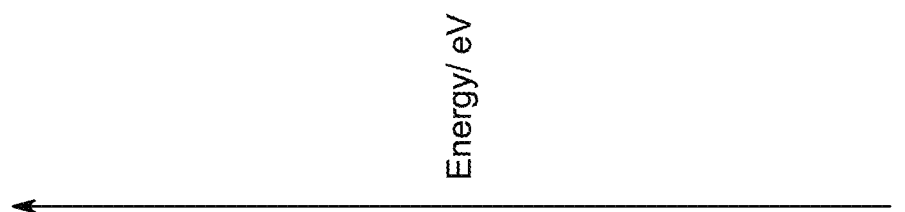
FIG. 8A is a schematic diagram of an energy gap aligned electron transfer mechanism of ZnO-NS, according to certain embodiments.
Figure 8B:
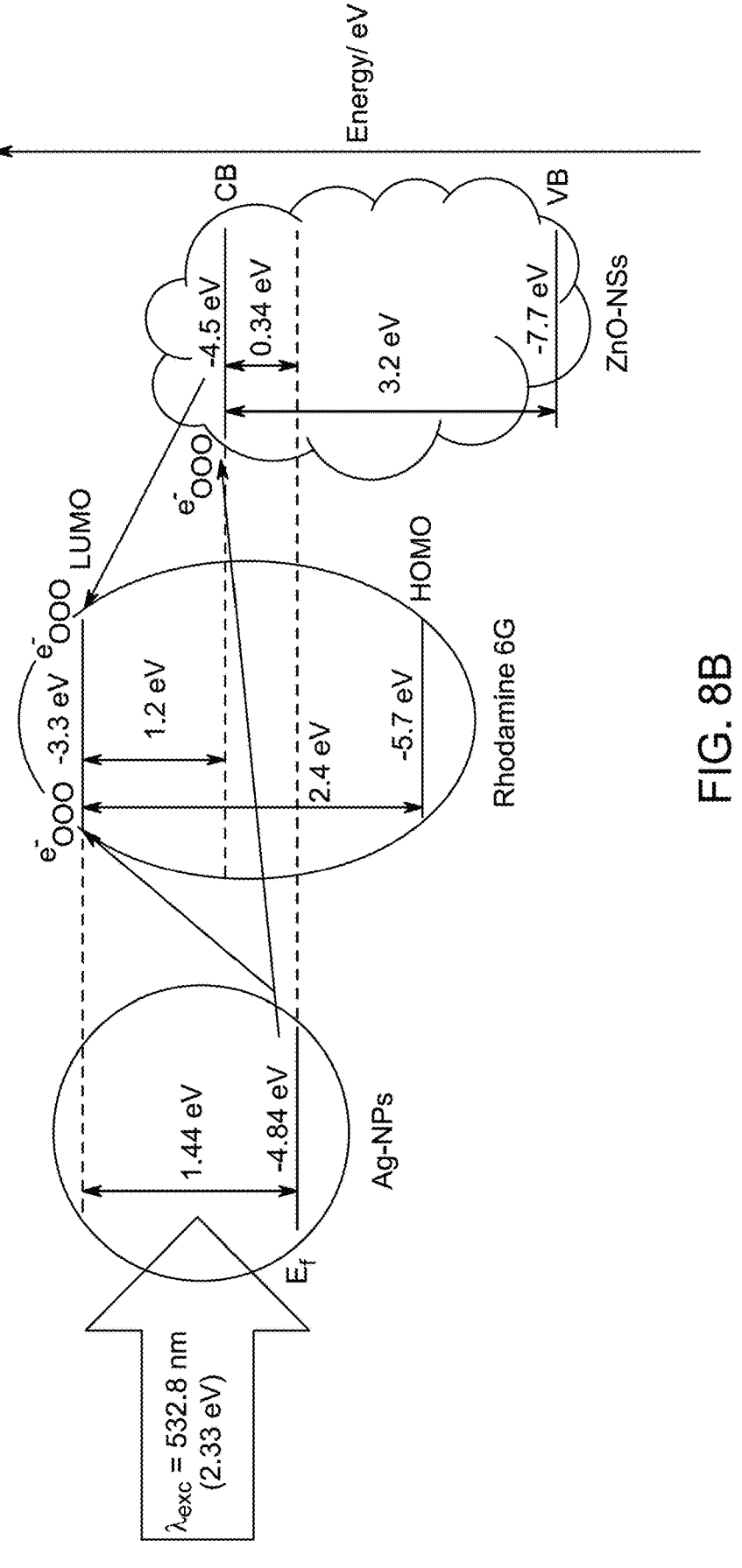
FIG. 8B is a schematic diagram of an energy gap aligned electron transfer mechanism of Ag-NPs@ZnO-NS with R6G, according to certain embodiments.

In this context, the energy levels of the analytes in the highest occupied molecular orbit (HOMO) and lowest unoccupied molecular orbit (LUMO), the Fermi level of the metal, and the locations of the valence band (VB) and the conduction band (CB) of metal oxide define the suitability of the system. Two systems were examined in this study: metal oxide-analyte (referred to ZnO-NS-R6G) and metal-metal oxide-analyte (referred to Ag-NPs@ZnO-NS-R6G) as demonstrated in FIGS. 8A-8B. Energy levels of the CB and the VB of ZnO-NS are 4.5 eV and 7.7 eV, the LUMO and HOMO level positions of the R6G are 3.3 eV and 5.7 eV, and the Fermi level of Ag in vacuum is 4.84 eV. For the metal oxide-analyte system (i.e., ZnO-NS-R6G construct), the incident photon could not excite free electrons and holes, as shown in FIG. 8A, as the photon energy of incident excitation of wavelength of 532 nm (i.e., 2.33 eV) was smaller than the band gap energy (3.2 eV) of the metal oxide (i.e., ZnO-NS). The incident excitation of 532 nm (i.e., 2.33 eV) was unable to excite free electrons and holes of the analyte, R6G, which has a band gap energy of 2.4 eV. The energy band diagram of ZnO-NS-R6G construct has been shown in FIG. 8A. It is evident in the experimental study shown in FIG. 6A that no Raman signal of R6G was detected in the presence of ZnO-NS. In ihe metal-metal oxide-analyte system (i.e., Ag-NPs@ZnO-NS-R6G construct), the incident excitation of 532 nm (i.e., 2.33 eV) was strong enough to generate "hot electrons" from Ag-NPs and subsequently are excited to the LUMO level of the R6G. This is because the energy difference between the LUMO level of R6G and the Fermi level of Ag-NPs is 1.44 eV, which is less than the incident excitation of 532 nm (i.e., 2.33 eV), as illustrated in FIG. 8B. The "hot electrons" from Ag-NPs may be propelled to the CB of ZnO since there is an energy difference of 0.34 eV between the Fermi level of Ag and the CB of ZnO. Therefore, the electrons excited to the CB level of ZnO can be further transferred to the LUMO energy level of R6G due to lower energy difference (i.e., 1.2 eV) between the LUMO level of R6G and the CB of ZnO with reference to the incident excitation of 532 nm (i.e., 2.33 eV). Strong enhancement as high as six orders higher in SERS signal was observed in the presence of the metal-metal oxide-analyte system (i.e., Ag-NPs@ZnO-NS-R6G construct), as shown and in FIG. 7A. The strong SERS enhancement factor of R6G in the presence of Ag-NPs@ZnO-NS was due to the combination of EM enhancement as well as the CE enhancement involving synergistic activities and efficient charge transfer amongst plasmonic Ag-NPs, ZnO-NS, and R6G.

A ZnO-NS was successfully synthesized and functionalized with Ag-NPs via a generic synthesis technique. The as-synthesized ZnO-NS was revealed to be nanocrystalline, varied in length, and had hexagonal faces on both sides, according to FESEM analysis. The lattice fringe spacing of 0.285 nm, as determined by HR-TEM, was found to be in good agreement with the spacing of {100} planes of the wurtzite phase of ZnO, according to the JCPDS 36-1451 database. The SAED pattern produced at the ZnO-NS together with bright spots therein indicated different planes of the ZnO wurtzite phase. The ZnO-NS was catalyzed with the AgNO$_3$ precursor, which made them fragile and nanoporous. Ag-NPs and ZnO-NS coexisted in the Ag-NPs@ZnO-NS constructs, as shown by HRTEM. In the same HRTEM image, there were lattice fringes spaced of 0.275 nm and 0.221 nm. The values were found to be in good agreement with the spacing of the {111} plane of the FCC structure of Ag-NPs and the {100} plane of the wurtzite phase of ZnO, as per the JCPDS 04-0783 and 36-1451 databases, respectively. The nanoporous characteristics of Ag-NP integrated into the ZnO-NS combine EM and CE improvements to generate an enhancement in SERS-activity. Using R6G, a common Raman-active dye, ZnO-NS and Ag-NPs@ZnO-NS were tested for SERS-activity. ZnO-NS was found to offer no Raman peaks other than those for ZnO, but Ag-NPs@ZnO-NS was found to exhibit SERS amplification. A charge transfer mechanism has demonstrated support for experimental results. Such a generic route to turn semiconductor nanostructures into SERS-active substrates using metal NPs is not only important to understand the SERS-process, but also to open new strategies to devise efficient SERS-active substrates.

Numerous modifications and variations of the present disclosure are possible in light of the above teachings. It is therefore to be understood that within the scope of the appended claims, the disclosure may be practiced otherwise than as specifically described herein.

The invention claimed is:

1. A surface-enhanced Raman scattering material, comprising:
   a zinc oxide nanostructure; and
   silver nanoparticles,
   wherein the silver nanoparticles are incorporated into the zinc oxide nanostructure to form a silver nanoparticle-incorporated zinc oxide nanostructure,
   wherein the silver nanoparticle-incorporated zinc oxide nanostructure comprises zinc in an amount of 52 to 58 percent by weight (wt. %), oxygen in an amount of 42 to 47 wt. %, and silver in an amount of 0.1 to 0.6 wt. % based on a total weight of the silver nanoparticle-incorporated zinc oxide nanostructure,
   wherein the silver nanoparticle-incorporated zinc oxide nanostructure is porous with an average pore diameter of 20 to 100 nm.

2. The surface-enhanced Raman scattering material of claim 1, wherein the zinc oxide nanostructure has a wurtzite structure.

3. The surface-enhanced Raman scattering material of claim 1, wherein the zinc oxide nanostructure has a P6$_3$mc space group.

4. The surface-enhanced Raman scattering material of claim 1, wherein the zinc oxide nanostructure comprises zinc in an amount of 56 to 60 wt. % and oxygen in an amount of 39 to 43 wt. % based on a total weight of the zinc oxide nanostructure.

5. The surface-enhanced Raman scattering material of claim 1, wherein the zinc oxide nanostructure is in the form of agglomerated six-sided beams with an average length of 100 to 2000 nm.

6. The surface-enhanced Raman scattering material of claim 5, wherein the agglomerated six-sided beams are branched with a face of a first six-sided beam attached to a side of a second six-sided beam.

7. The surface-enhanced Raman scattering material of claim 5, wherein sides of the agglomerated six-sided beams have an average length of 300 to 500 nm.

8. The surface-enhanced Raman scattering material of claim 1, wherein the silver nanoparticle-incorporated zinc oxide nanostructure has an average length of 1 to 4 μm and an average width of 0.5 to 3 μm.

9. The surface-enhanced Raman scattering material of claim 1, wherein the zinc oxide nanostructure has a lattice fringe spacing of 0.28 to 0.29 nm.

10. The surface-enhanced Raman scattering material of claim 1, wherein the silver nanoparticle-incorporated zinc oxide nanostructure has a lattice fringe spacing of 0.27 to 0.28 nm and 0.21 to 0.23 nm.

11. The surface-enhanced Raman scattering material of claim 1, wherein silver nanoparticles in the silver nanoparticle-incorporated zinc oxide nanostructure have a face-centered-cubic crystal structure.

12. The surface-enhanced Raman scattering material of claim 1, wherein the silver nanoparticles are in the shape of spheres having an average diameter of 2 to 20 nm.

13. The surface-enhanced Raman scattering material of claim 1, wherein the silver nanoparticle-incorporated zinc oxide nanostructure has d-values of 2.39 to 2.4 Å, 2.39 to 2.41 Å, 1.86 to 1.87 Å, 1.39 to 1.4 Å, 1.2 to 1.21 Å, and 0.92 to 0.94 Å.

14. A method of surface-enhanced Raman spectroscopy, comprising:
   contacting a substrate with the surface-enhanced Raman scattering material of claim 1,
   wherein the substrate is adsorbed onto the surface-enhanced Raman scattering material, shining a light on the substrate; and
   detecting vibrational modes of the substrate.

15. The method of claim 14, wherein enhancement factors for vibrational modes of the substrate are from 1×10$^5$ to 5×10$^6$ determined by an intensity of peaks and a number of analytes in Raman spectra.

16. The method of claim 14, wherein an excitation wavelength is from 530 to 535 nm.

17. The method of claim 14, wherein the substrate is rhodamine 6G.

18. The method of claim 14, wherein the substrate is not detected on the surface-enhanced Raman scattering material without the silver nanoparticles.

19. The method of claim 14, wherein vibrational modes of the substrate are enhanced by electromagnetic enhancement and chemical enhancement.

20. The surface-enhanced Raman scattering material of claim 1, wherein the surface-enhanced Raman scattering material is made by a process comprising:

dissolving a zinc salt in water to form a zinc solution;

dissolving a hydroxide salt in water to form a hydroxide solution;

mixing the hydroxide solution and the zinc solution;

refluxing the hydroxide solution and the zinc solution for 20 to 40 minutes to form a basic solution;

dissolving a silver salt in water to form a silver solution;

mixing the silver solution and the basic solution to form a product solution; and heating the product solution at a temperature of 150 to 250° C. for 40 to 56 hours to form the surface-enhanced Raman scattering material.

\* \* \* \* \*